US011550192B1

(12) United States Patent
Ohe et al.

(10) Patent No.: US 11,550,192 B1
(45) Date of Patent: Jan. 10, 2023

(54) LIQUID CRYSTAL DEVICE AND SYSTEM FOR THZ ELECTROMAGNETIC WAVES

(71) Applicant: National Tsing Hua University, Hsinchu (TW)

(72) Inventors: Masahito Ohe, Hsinchu (TW); Deng-Yun Zheng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/522,911

(22) Filed: Nov. 10, 2021

(51) Int. Cl.
*G02F 1/1343* (2006.01)
*G02F 1/1337* (2006.01)
*G02F 1/1335* (2006.01)

(52) U.S. Cl.
CPC ........ *G02F 1/13439* (2013.01); *G02F 1/1337* (2013.01); *G02F 1/133531* (2021.01); *G02F 1/134363* (2013.01)

(58) Field of Classification Search
CPC .......... G02F 1/13439; G02F 1/133531; G02F 1/1337; G02F 1/134363; G02F 1/134381
See application file for complete search history.

(56) References Cited

U.S. PATENT DOCUMENTS

2013/0010235 A1* 1/2013 Hirosawa .......... G02F 1/134309
349/123
2013/0050602 A1 2/2013 Macpherson et al.

OTHER PUBLICATIONS

Holger Maune et al., "Microwave Liquid Crystal Technology," Crystals, vol. 8, Sep. 2018, pp. 1-27.
Benjamin S.-Y. Ung, et al., "Towards a Rapid Terahertz Liquid Crystal Phase Shifter: Terahertz In-Plane and Terahertz Out-Plane (TIP-TOP) Switching," IEEE Transactions On Terahertz Science and Technology, Mar. 2018, pp. 1-6.

* cited by examiner

*Primary Examiner* — James A Dudek
(74) *Attorney, Agent, or Firm* — JCIPRNET

(57) ABSTRACT

A liquid crystal device including a single or a plurality of pixel elements is provided. Each pixel element includes: a first substrate, a second substrate parallel to the first substrate, a liquid crystal layer disposed between the first substrate and the second substrate, a first plurality of electrodes formed between the first substrate and the liquid crystal layer, a second plurality of electrodes formed between the second substrate and the liquid crystal layer. The first plurality of electrodes and the second plurality of electrodes are composed to generate electric fields in three orthogonal directions, and the electric fields in two of the three orthogonal directions are in-plane electric fields, while the other electric field of the three orthogonal directions is an out-of-plane electric field.

16 Claims, 25 Drawing Sheets

US 11,550,192 B1

LIQUID CRYSTAL DEVICE AND SYSTEM FOR THZ ELECTROMAGNETIC WAVES

TECHNICAL FIELD

The disclosure relates to a liquid crystal device, more specifically, to the implement of liquid crystals to provide a device with continuously adjusting phase shift or delay, i.e. a phase shifter, for various applications in terahertz (THz) (1 THz=$10^{12}$ Hz) electromagnetic wave or sub-mm electromagnetic wave.

BACKGROUND

THz wave technology has shown great potential for development in fields including time-domain spectroscopy, THz imaging, and medical applications. Further, THz communication and phase array radar also become feasible. The above applications all need THz quasi-optical devices such as polarizers, filters, phase shifters, and modulators, etc., for signal processing.

Liquid crystal (LC) devices are widely used in THz frequencies. In order to operate at THz frequencies, LC devices use a thick cell gap to satisfy the required retardation. However, the thick cell gap leads to an extremely slow response.

SUMMARY

The disclosure provides a liquid crystal device, and specifically, a liquid crystal phase shifter for THz electromagnetic waves with a type of LC switching, which results in hexa-directional switching among initial, intrinsic in-plane and out-of-plane reorientations of the LCs providing a broader range of phase shifts while maintaining a fast response time.

The liquid crystal device according to an exemplary embodiment may include not limited to a single or a plurality of pixel elements as each pixel element may include a first substrate, a second substrate facing the first substrate and parallel to the first substrate, a liquid crystal layer disposed between the first substrate and the second substrate, a first plurality of electrodes formed between the first substrate and the liquid crystal layer, wherein the first plurality of electrodes is grating-type and/or finger-type electrodes, a second plurality of electrodes formed between the second substrate and the liquid crystal layer, wherein the second plurality of electrodes, is grating-type and/or finger-type electrodes, wherein the same grating-type and/or finger-type electrode of the first plurality of electrodes and the second plurality of electrodes are formed and facing each other with a cell gap, wherein the first plurality of electrodes and the second plurality of electrodes are composed to generate electric fields in three orthogonal directions, and the electric fields in two of the three orthogonal directions are in-plane electric fields and are substantially parallel to the first substrate, the second substrate and to the liquid crystal layer, while the other electric field of the three orthogonal directions is an out-of-plane electric field and is substantially perpendicular to the first substrate and the second substrate.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
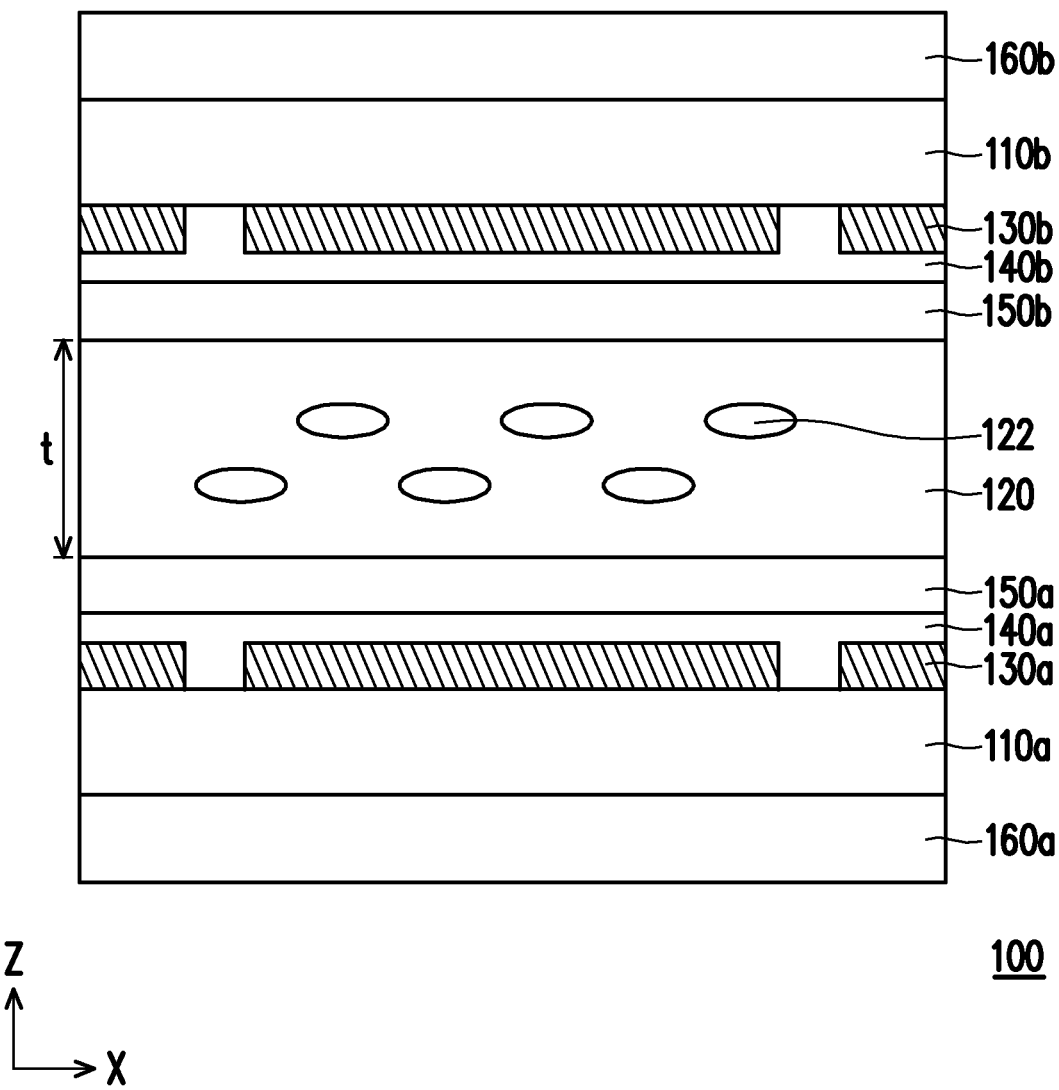
FIG. 1 is a schematic cross-sectional view of a liquid crystal pixel element.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following embodiments, wordings used to indicate directions, such as "up," "down," "front," "back," "left," and "right", merely refer to directions in the accompanying drawings. Therefore, the directional wording is used to illustrate rather than limit the disclosure. In the accompanying drawings, each drawing illustrates the general features of the methods, structures, and/or materials used in the specific exemplary embodiments. The drawings should not be construed as definition or limitation to the scope and property coveted by the specific exemplary embodiments. For instance, relative thicknesses and locations of film layers, regions or structures may be reduced or enlarged for clarity.

FIG. 1 is a schematic cross-sectional view of a liquid crystal pixel element 100 according to an embodiment of the invention.

In FIG. 1, the liquid crystal pixel element 100 includes a first substrate 110a and a second substrate 110b. The second substrate 110b is facing the first substrate 110a and is parallel to the first substrate 110a. The first substrate 110a and the second substrate 110b have similar structures and properties. The first substrate 110a and the second substrate 110b are both substrates having uniform thickness in the Z-direction. The first substrate 110a and the second substrate 110b are made of materials transparent to THz frequencies. In some embodiments, a range of the THz frequency is between 0.1 to 10 THz, but is not limited thereto. In some embodiments, the material of the first substrate 110a and the second substrate 110b is glass or plastic, but is not limited thereto.

The liquid crystal pixel element 100 further includes a liquid crystal layer 120 with liquid crystal molecules 122. The liquid crystal layer 120 is disposed between the first substrate 110a and the second substrate 110b in the vertical Z-direction. The liquid crystal layer 120 has a uniform thickness in the Z-direction. In some embodiments, the thickness of the liquid crystal layer 120 is between 50-150 micrometer (μm), preferably 100 μm or less, but is not limited thereto.

The liquid crystal pixel element 100 further includes a plurality of electrodes 130a formed between the first substrate 110a and the liquid crystal layer 120, and a plurality of electrodes 130b formed between the second substrate 110b and the liquid crystal layer 120. The electrodes 130a and the electrodes 130b are separated by a cell gap in the Z-direction, wherein the liquid crystal layer 120 is disposed in the cell gap. An insulating layer 140a and an insulating layer 140b are formed on the electrodes 130a and electrodes 130b respectively to insulate the electrodes 130a and the electrodes 130b and other layers of the liquid crystal pixel elements 100. In some embodiments, the material of the electrodes 130a and 130b is metal or any other conductive materials, such as copper, aluminum, poly(3,4-ethylenedioxythiophene) polystyrene sulfonate and graphene, but is not limited thereto. In some embodiments, the thickness of the electrodes 130a and 130b is between 100-500 nm, and preferably 200 run, but is not limited thereto. The width of the electrodes 130a and 130b is between 5-15 μm, and preferably 10 μm, but is not limited thereto. In some embodiments, the thickness of the insulating layers 140a and 140b could be between 200-1000 nm, preferably 500 nm, but is not limited thereto.

The electrodes 130a and the electrodes 130b include grating-type and/or finger-type electrodes. When a voltage difference is applied to the electrodes 130a and the electrodes 130b by a power source controlled by driving modules (not shown), the electrodes 130a and the electrodes 130b together generate electric fields in three orthogonal directions, such as along the X-, Y- and/or Z-directions. The electric fields generated by the electrodes 130a and 130b in two of the three orthogonal directions, such as along the X-direction and the Y-direction, are referred to as in-plane electric fields, and are substantially parallel to the first substrate 110a, the second substrate 110b and the liquid crystal layer 120. The other electric field of the three orthogonal directions, such as along the Z-direction, is referred to as an out-of-plane electric field and is substantially perpendicular to the first substrate 110a and the second substrate 110b.

By applying electric fields in three orthogonal directions, with two in-plane electric fields mutually perpendicular to each other, and one out-of-plane electric field, the liquid crystal molecules 122 in the liquid crystal layer 120 may perform hexdirectional hexa-directional switching between in-plane and out-of-plane orientations.

The liquid crystal pixel element 100 further includes alignment layers 150a and 150b disposed on electrodes 130a and electrodes 130b respectively, and in contact with two opposing sides of liquid crystal layer 120. The alignment layers 150a and 150b are configured to align the liquid crystal molecules 122 to an initial alignment when there are no electric fields in the liquid crystal layer 120 by controlling the pretilt angle and the polar angle of the liquid crystal molecules 122. The pretilt angle is an angle between the long axis of the liquid crystal molecule 122 and the surface of the alignment layer (XY-plane), the azimuthal angle is an angle between the long axis of the liquid crystal molecules 122 projected on the XY plane and a fixed axis (for example, along X-direction) in the XY plane perpendicular to Z-direction. In some embodiments, the material for the alignment layers 150a and 150b is polymer such as polyimide, but is not limited thereto.

The liquid crystal pixel element 100 further includes polarizers 160a and 160b disposed on the first substrate 110a and the second substrate 110b respectively. The first polarizer 160a and the second polarizer 160b are configured to polarize the light coming in or out from the liquid crystal layer 120. In some embodiments, the polarizer 160a may be formed between the first substrate 110a and the insulating layer 140a, and the polarizer 160b may be formed between the second substrate 110b and the insulating layer 140b. In some embodiments, the finger-type or strip-type electrodes 130a and 130b are used together as a wire-grid polarizer.

In some embodiments, the polarization directions of the polarizers 160a and 160b are perpendicular or parallel to each other. When a voltage is applied across the liquid crystal layer 120, causing the liquid crystal molecules 122 to twist, this in turn rotates the polarization of light passing through the liquid crystal layer 120. THz light oscillating in one direction may more easily pass through the liquid crystal layer 120 than light oscillating in another direction. The refractive index (a value for how much slower the light propagates in a material) can be different for light oscillating parallel or perpendicular to the liquid crystal molecules. This is referred to as "optical anisotropy", which is defined as the difference between the extraordinary refractive index $n_e$ and ordinary refractive index $n_o$ ($\Delta n = n_e - n_o$) and is called "birefringence".

Figure 2A:
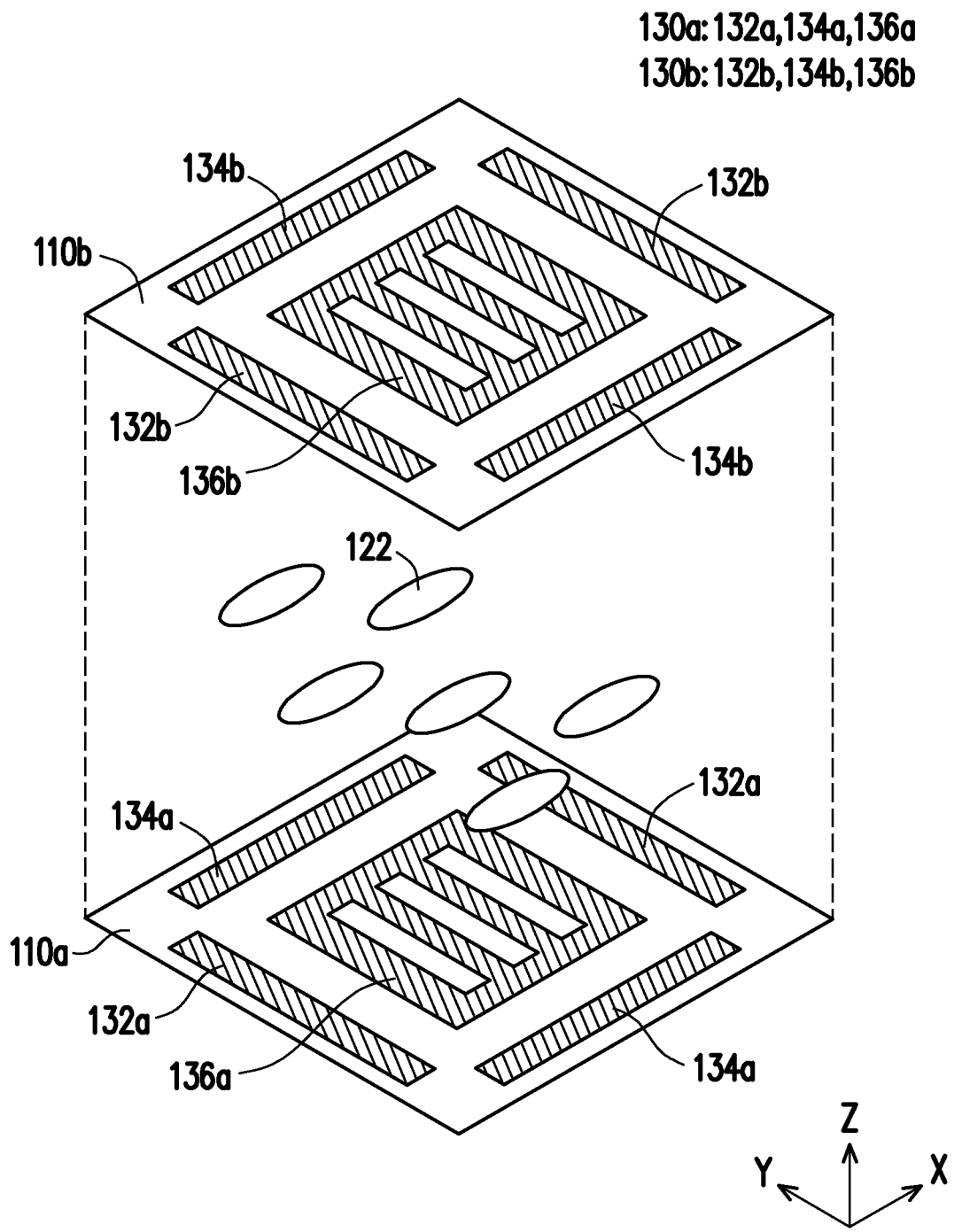
FIG. 2A is a schematic three-dimensional view of a liquid crystal pixel element.
Figure 2B:
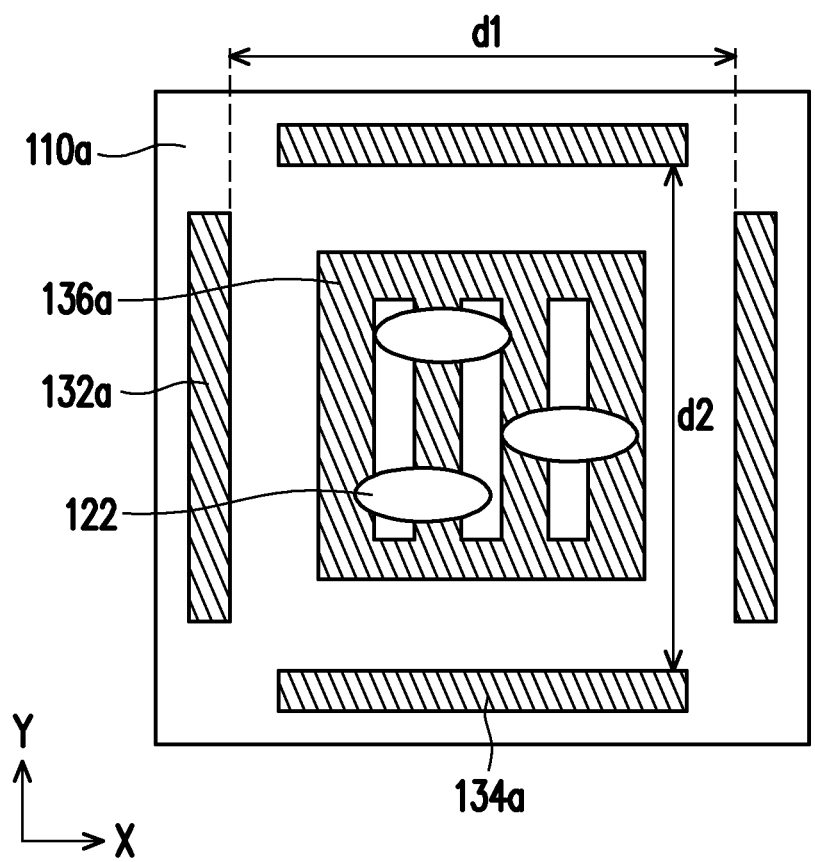
FIG. 2B is a schematic top view of the liquid crystal pixel element of FIG. 2A.
Figure 2C:
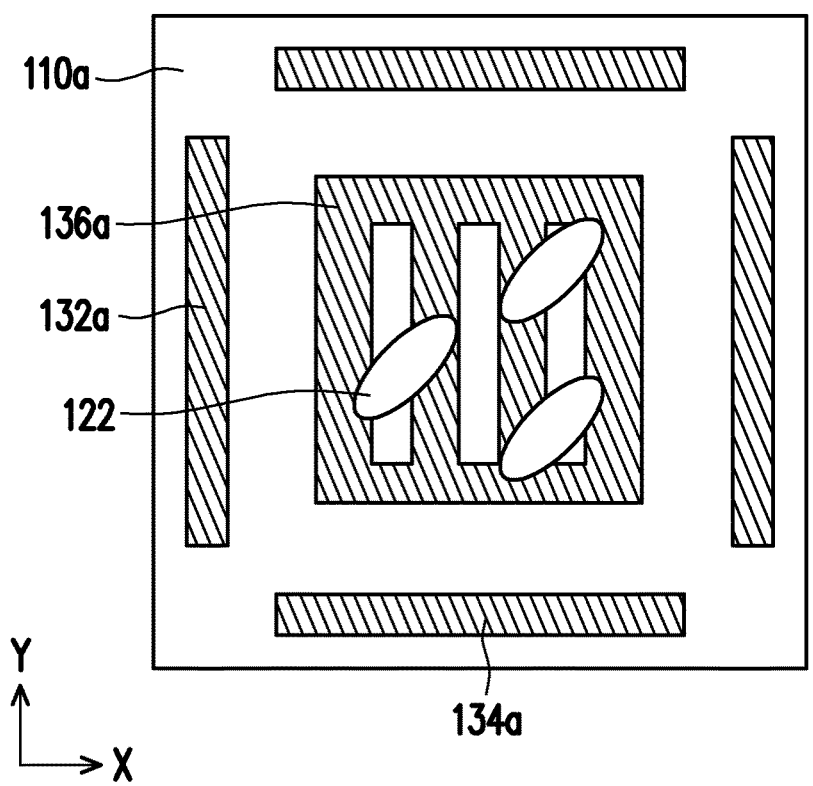
FIG. 2C is a schematic top view of the liquid crystal pixel element of FIG. 2A.
Figure 2D:
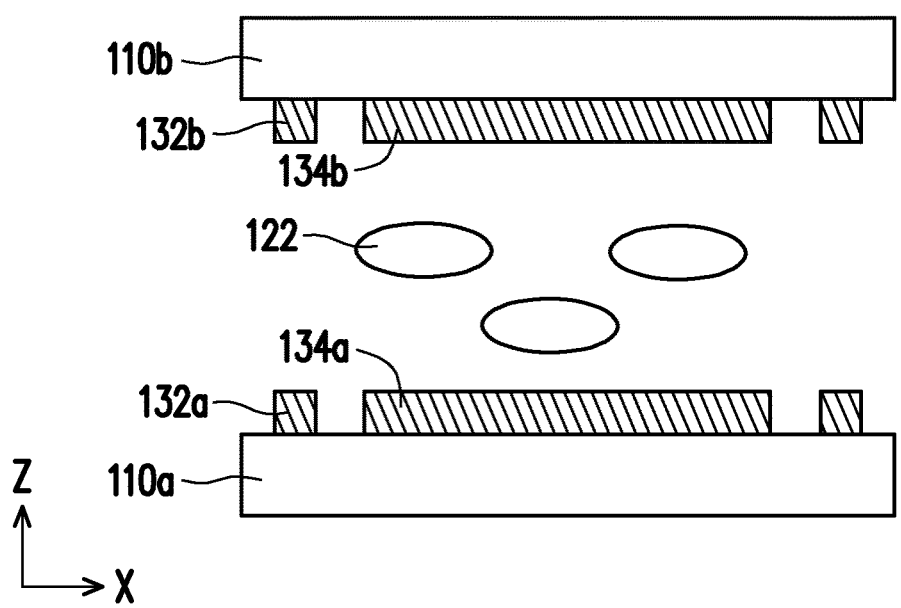
FIG. 2D is a schematic cross-sectional view of the liquid crystal pixel element of FIG. 2A.

FIG. 2A is a schematic three-dimensional view of a liquid crystal pixel element. FIG. 2B is a schematic top view of the liquid crystal pixel element of FIG. 2A. FIG. 2C is a schematic top view of the liquid crystal pixel element of FIG. 2A. FIG. 2D is a schematic cross-sectional view of the liquid crystal pixel element of FIG. 2A.

Please refer to FIGS. 2A to 2D. For the purpose of clarity, some elements of liquid crystal pixel element 100 are omitted.

As shown in FIG. 2A, the first plurality of electrodes 130a and the second plurality of electrodes 130b are presented. The first plurality of electrodes 130a includes a pair electrodes 132a, a pair of electrodes 134a, and an electrode 136a, which are all formed on the same level of the first substrate 110a. The second plurality of electrodes 130b includes a pair electrodes 132b, a pair of electrodes 134b, and an electrode 136b, which are all formed on the same level of the second substrate 110b. The first plurality of electrodes 130a and the second plurality of electrodes 130b are formed and facing each other with the same arrangements. The electrodes 132a, 132b, 134a, and 134b are finger-type electrodes. The electrodes 136a and 136b are grating-type electrodes.

Referring to FIG. 2A and FIG. 2B, the pair of electrodes 132a are formed on the first substrate 110a. The electrodes 132a, which are finger-type electrodes, are parallel to each other. Each of the electrodes 132a has a strip shape, with the long axis of each of the electrodes 132a perpendicular to the X-direction. In some embodiments, the electrodes 132a may have other shapes, which is not limited thereto. When applying a voltage difference between the electrodes 132a, the pair of electrodes 132a generates an in-plane electric field substantially parallel to the first substrate 110a and the liquid crystal layer 120. The direction of the in-plane electric field generated by the electrodes 132a may be along the positive or negative X-direction, depending on the direction of the voltage applied to the electrodes 132a. The electric field generated along the X-direction reorients the liquid crystal molecules 122 in the liquid crystal layer 120 along the X-direction. The pair of electrodes 132b formed on the second substrate 110b has properties similar to the pair of electrodes 132a, which is not repeated hereof.

Referring to FIG. 2A and FIG. 2B, the pair of electrodes 134a are formed on the first substrate 110a. The electrodes 134a, which are finger-type electrodes, are parallel to each other. Each of the electrodes 134a has a strip shape, with the long axis of each of the electrodes 134a perpendicular to the Y-direction. In some embodiments, the electrodes 134a may have other shapes, which is not limited thereto. When applying a voltage difference between the electrodes 134a, the pair of electrodes 134a generates an in-plane electric field substantially parallel to the first substrate 110a and the liquid crystal layer 120. The direction of the in-plane electric field generated by the electrodes 134a may be along the positive or negative Y-direction, depending on the direction of the voltage applied to the electrodes 134a. The electric field generated along the Y-direction reorients the liquid crystal molecules 122 in the liquid crystal layer 120 along the Y-direction. The pair of electrodes 134b formed on the second substrate 110b has properties similar to the pair of electrodes 134a, which is not repeated hereof.

Referring to FIG. 2A and FIG. 2B, the electrode 136a is formed on the first substrate 110a and the electrode 136b is formed on the second substrate 110b. As shown in FIG. 2A and FIG. 2B, the electrodes 136a and 136b are grating-type electrodes. In some embodiments, the electrodes 136a and 136b may have other shapes, which is not limited thereto. The directions of the grating-type electrodes 136a and 136b are both extending along the Y-direction. When applying a voltage difference between the electrodes 136a and 136b, the electrodes 136a and 136b together generate an out-of-plane electric field substantially perpendicular to the first substrate 110a, the second substrate 110b and the liquid crystal layer 120. The direction of the out-of-plane electric field may be along the positive or negative Z-direction, depending on the direction of the voltage applied to the electrodes 136a and 136b. In some embodiments, the electric field generated along the Z-direction reorients the liquid crystal molecules 122 in the liquid crystal layer 120 along the Z-direction.

Referring to FIG. 2B and FIG. 2D, when the voltage is not applied to the electrodes 132a, 132b, 134a, 134b, 136a and/or 136b, there is no electric field generated in the liquid crystal layer 120. Therefore, the liquid crystal molecules 122 are in their initial alignment. In some embodiments, the initial alignment of the liquid crystal molecules 122 is in-plane, which the long axis of the liquid crystal molecules 122 are parallel to the first substrate 110a and the second substrate 110b. In some embodiments, the initial alignment of the liquid crystal molecule 122 is nearly perpendicular to the extending direction of the grating-type electrode 136a. In other words, the angle between the long axis of the liquid crystal molecule 122 and the extending direction of the electrode 136a is nearly perpendicular. Referring to FIG. 2B, the extending direction of the electrode 136a is along the Y-direction. In some embodiments, the angle between the long axis of the liquid crystal molecule 122 and the extending direction of the electrode 136a is between 85-95 degrees, which is nearly the direction of the X-direction, as shown in FIG. 2D, but the initial orientation angle is not limited thereto.

Referring to FIG. 2B, the electrodes 132a and electrodes 134a are configured to generate in-plane electric fields. As shown in FIG. 2B, a distance between the two electrodes 132a is defined as d1, and a distance between the two electrodes 134a is defined as d2. In some embodiments, a ratio of the distance d1 between the two electrodes 132a and the distance d2 between the two electrodes 134a, d1/d2, is substantially equal to 1. In some embodiments, the ratio d1/d2 is between 0.9 and 1.1. Since the distance d1 between the two electrodes 132a and the distance d2 between the two electrodes 134a are substantially the same, when applying similar voltage difference to the electrodes 132a and 134a, the electric field generated by the electrodes 132a and the electric field generated by the electrodes 134a may be substantially the same, so the two in-plane electric fields in the liquid crystal layer 120 may have more similar electric field strength.

Referring to FIG. 2B, the initial alignment of the liquid crystal molecules 122 is along the X-direction. In some embodiments, the distance d2 between the electrodes 134a, which generate the in-plane electric field perpendicular to the initial alignment of the liquid crystal molecules 122, is shorter than the distance d1 between the electrodes 132a, which generate the in-plane electric field perpendicular to the initial alignment of the liquid crystal molecules 122, which is d2/d1<1, or d1/d2>1. The electrodes 132a generate the in-plane electric field along the X-direction, which is parallel to the initial alignment of the liquid crystal molecules 122. The electrodes 134a generate the in-plane electric field along the Y-direction, which is perpendicular to the initial alignment of the liquid crystal molecules 122. When the distance d2 between the electrodes 134a is shorter than the distance d1 between the electrodes 132a, the strength of the electric field generated by the electrodes 134a will be stronger than the strength of the electric field generated by the electrodes 132a, which is easier to orient the liquid crystal molecules 122 along the direction of the electric field generated by the electrodes 134a, which is perpendicular to the initial alignment of the liquid crystal molecules 122.

Referring to FIG. 2C, in some embodiments, the extending direction of the electrode 136a is along the Y-direction. The initial alignment of the liquid crystal molecules 122 is in-plane, which the long axis of the liquid crystal molecules 122 are parallel to the first substrate 110a and the second substrate 110b. In some embodiments, the initial alignment of the liquid crystal molecule 122 is nearly 45 degrees from the extending direction of the electrode 136a. In other words, the angle between the long axis of the liquid crystal molecule 122 and the extending direction of the electrode 136a is nearly 45 degrees. In some embodiments, the angle between the long axis of the liquid crystal molecule 122 and the extending direction of the electrode 136a is between 40-50 degrees, but is not limited thereto.

Figure 3A:
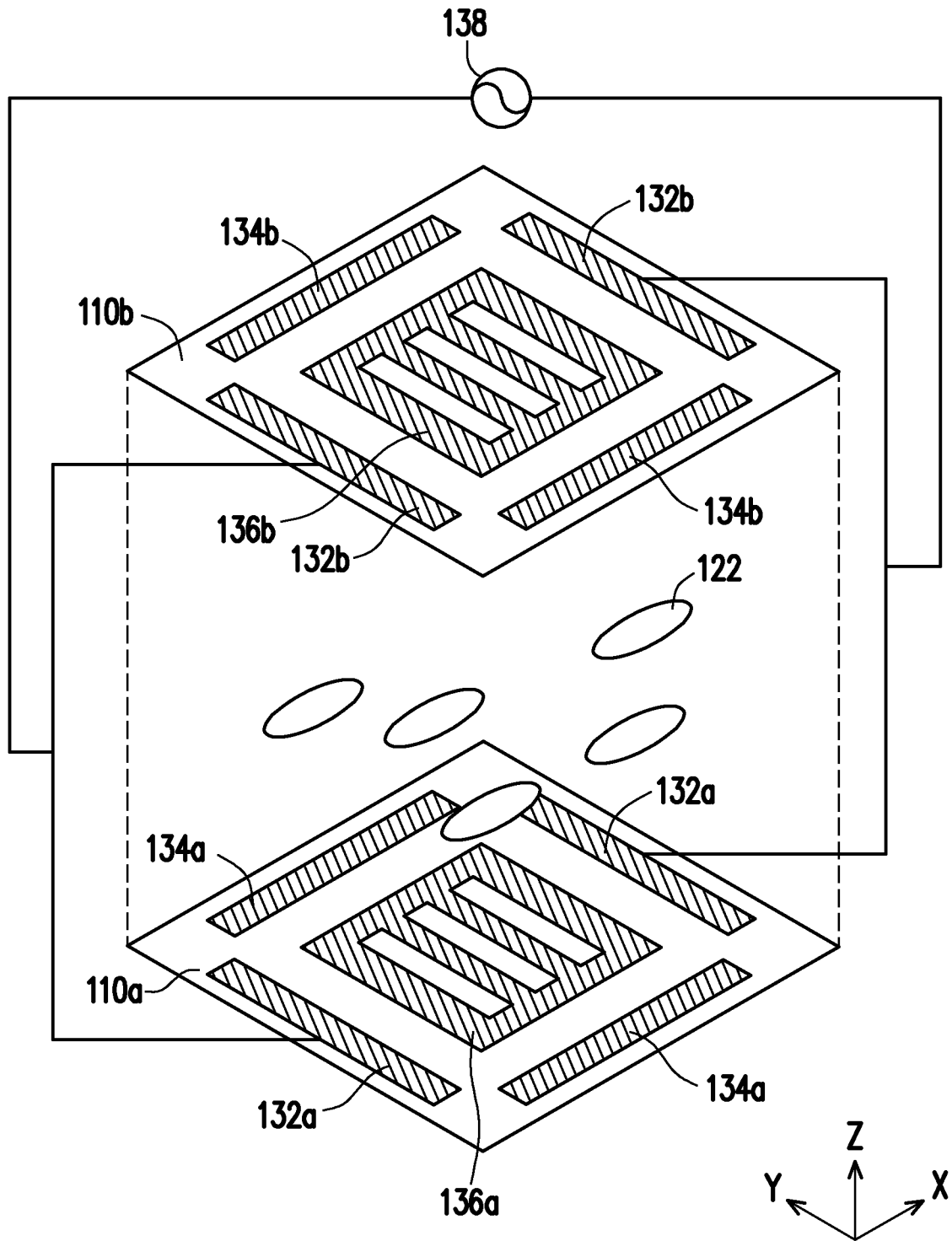
FIG. 3A is a schematic three-dimensional view of a liquid crystal pixel element.
Figure 3B:
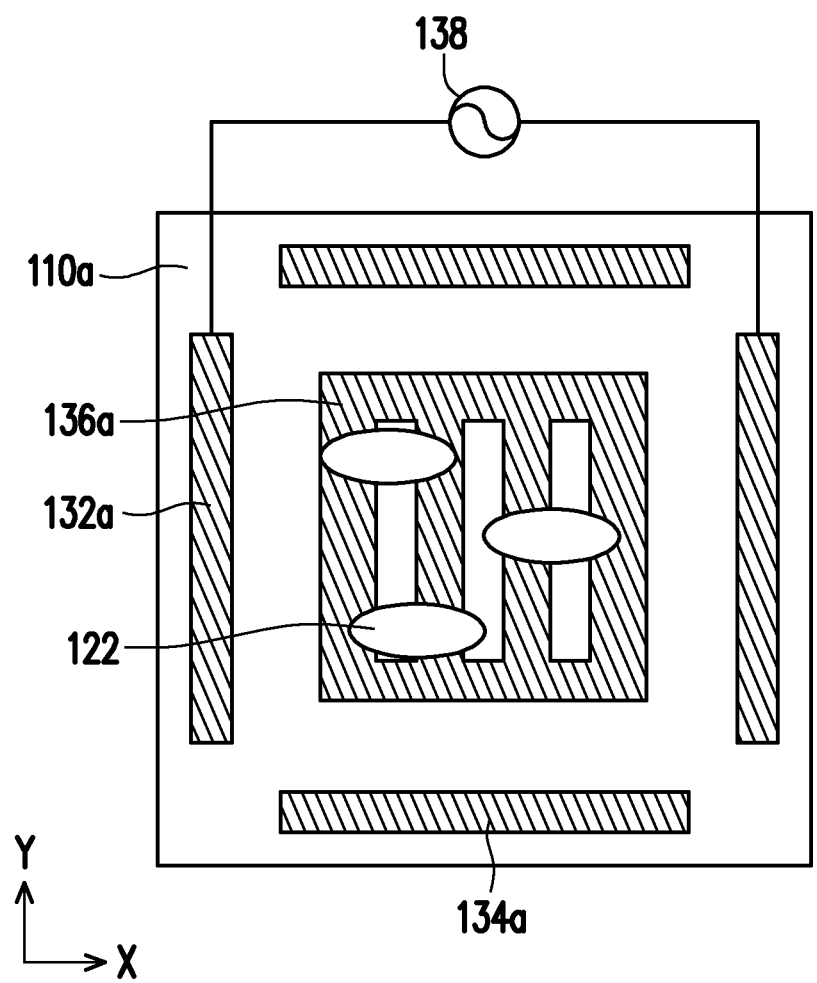
FIG. 3B is a schematic top view of the liquid crystal pixel element of FIG. 3A.
Figure 3C:
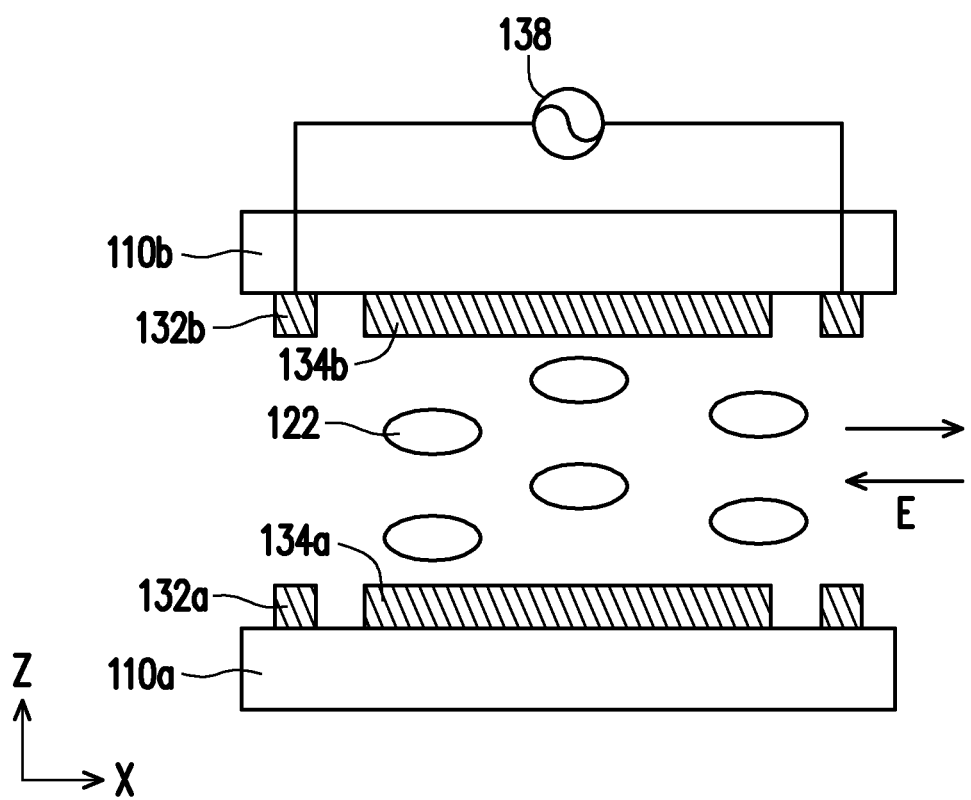
FIG. 3C is a schematic cross-sectional view of the liquid crystal pixel element of FIG. 3A.

FIG. 3A is a schematic three-dimensional view of a liquid crystal pixel element. FIG. 3B is a schematic top view of the liquid crystal pixel element of FIG. 3A. FIG. 3C is a schematic cross-sectional view of the liquid crystal pixel element of FIG. 3A.

Please refer to FIG. 3A, FIG. 3B, and FIG. 3C. In this embodiment, a power source 138 is connected to the pair of electrodes 132a on the first substrate 110a, and the pair of electrodes 132b on the second substrate 110b. When applying a voltage difference between the electrodes 132a, the pair of electrodes 132a generates an in-plane electric field substantially parallel to the first substrate 110a and the liquid crystal layer 120. The electric field generated by the electrodes 132a may be along the positive or negative X-direction which reorients the liquid crystal molecules 122 in the liquid crystal layer 120 along the same direction. Similarly, when applying a voltage difference between the electrodes 132b, the pair of electrodes 132b generates an in-plane electric field substantially parallel to the second substrate 110b and the liquid crystal layer 120. The electric field generated by the electrodes 132b is along the positive or negative X-direction which also aligns the liquid crystal molecules 122 in the liquid crystal layer 120 along the same direction.

As a result, by applying a voltage difference to the pair of electrodes 132a and 132b, the liquid crystal molecules 122 in the liquid crystal layer 120 are reoriented along the generated electric fields, which is along the positive or negative X-direction. In general, the average orientation direction of the liquid crystal molecules 122 is along the X-direction.

Figure 4A:
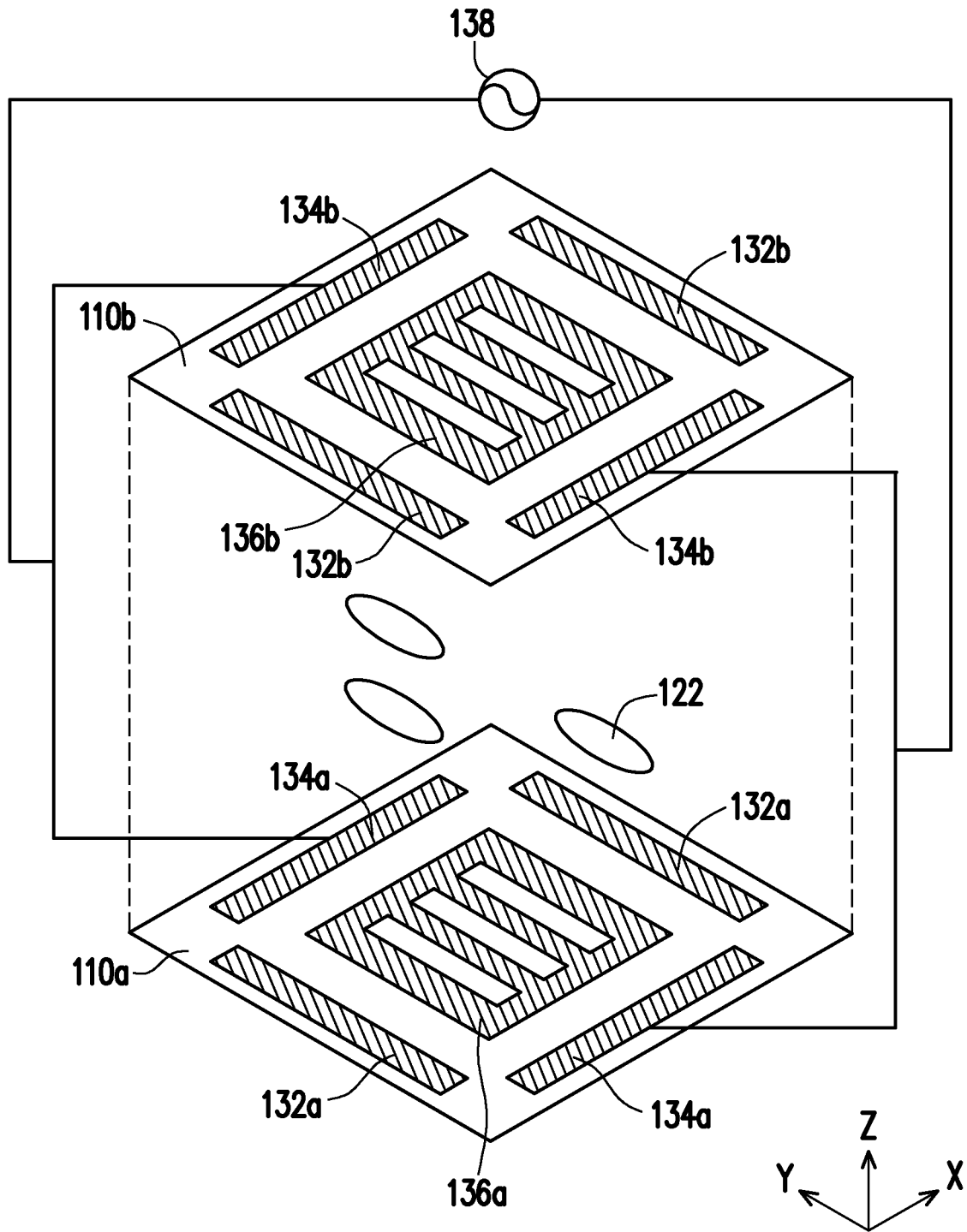
FIG. 4A is a schematic three-dimensional view of a liquid crystal pixel element.
Figure 4B:
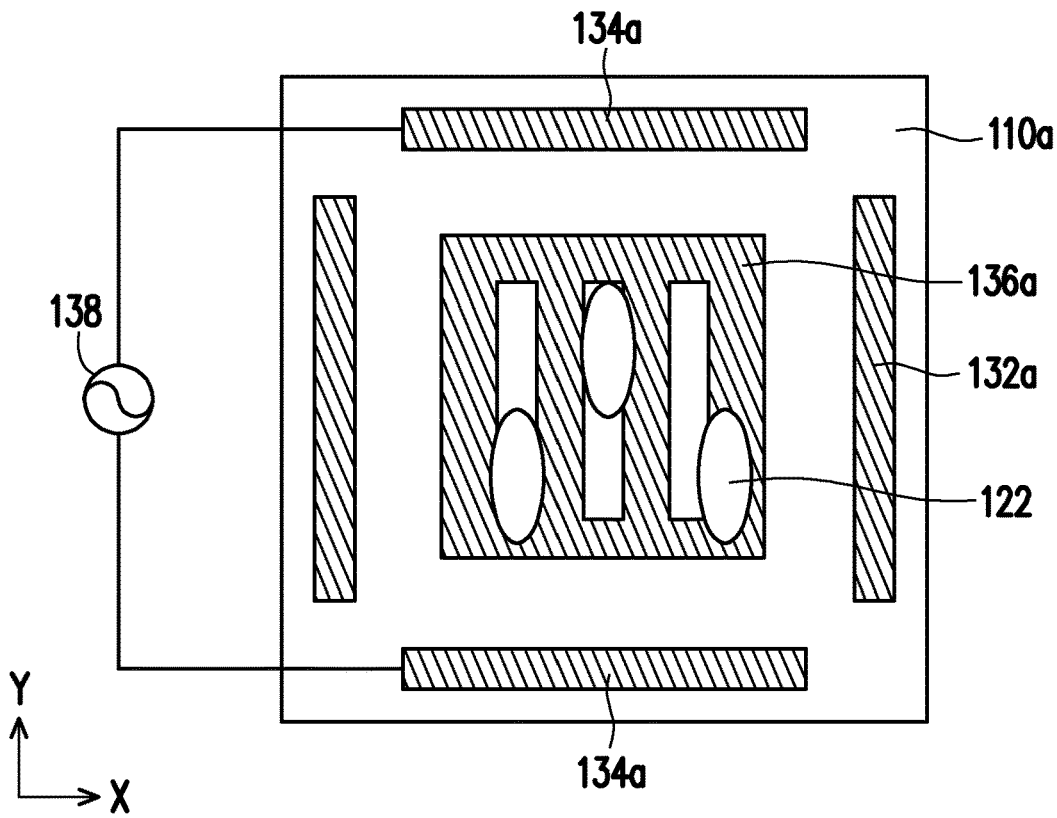
FIG. 4B is a schematic top view of the liquid crystal pixel element of FIG. 4A.
Figure 4C:
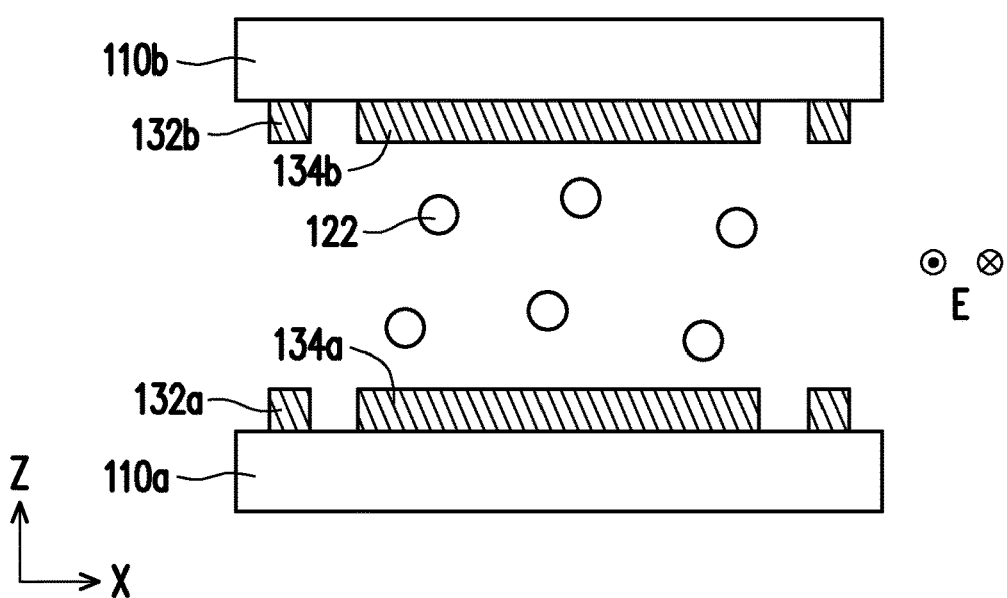
FIG. 4C is a schematic cross-sectional view of the liquid crystal pixel element of FIG. 4A.

FIG. 4A is a schematic three-dimensional view of a liquid crystal pixel element. FIG. 4B is a schematic top view of the liquid crystal pixel element of FIG. 4A. FIG. 4C is a schematic cross-sectional view of the liquid crystal pixel element of FIG. 4A.

Please refer to FIG. 4A, FIG. 4B, and FIG. 4C. In this embodiment, a power source 138 is connected to the pair of electrodes 134a on the first substrate 110a, and the pair of electrodes 134b on the second substrate 110b. When applying a voltage difference between the electrodes 134a, the pair of electrodes 134a generates an in-plane electric field substantially parallel to the first substrate 110a and the liquid crystal layer 120. The electric field generated by the pair of electrodes 134a is perpendicular to the electric field generated by the electrodes 132a. The electric field generated by the electrodes 134a may be along the positive or negative Y-direction which reorients the liquid crystal molecules 122 in the liquid crystal layer 120 along the same direction. Similarly, when applying a voltage difference between the electrodes 134b, the pair of electrodes 134b generates an in-plane electric field substantially parallel to the second substrate 110b and the liquid crystal layer 120. The electric field generated by the electrodes 134b is along the positive or negative Y-direction which also aligns the liquid crystal molecules 122 in the liquid crystal layer 120 along the same direction.

As a result, by applying a voltage difference to the pair of electrodes 134a and 134b, the liquid crystal molecules 122 in the liquid crystal layer 120 are reoriented along the generated electric fields, which is along the positive or negative Y-direction. In general, the average orientation direction of the liquid crystal molecules 122 is along the positive or negative Y-direction.

Figure 5A:
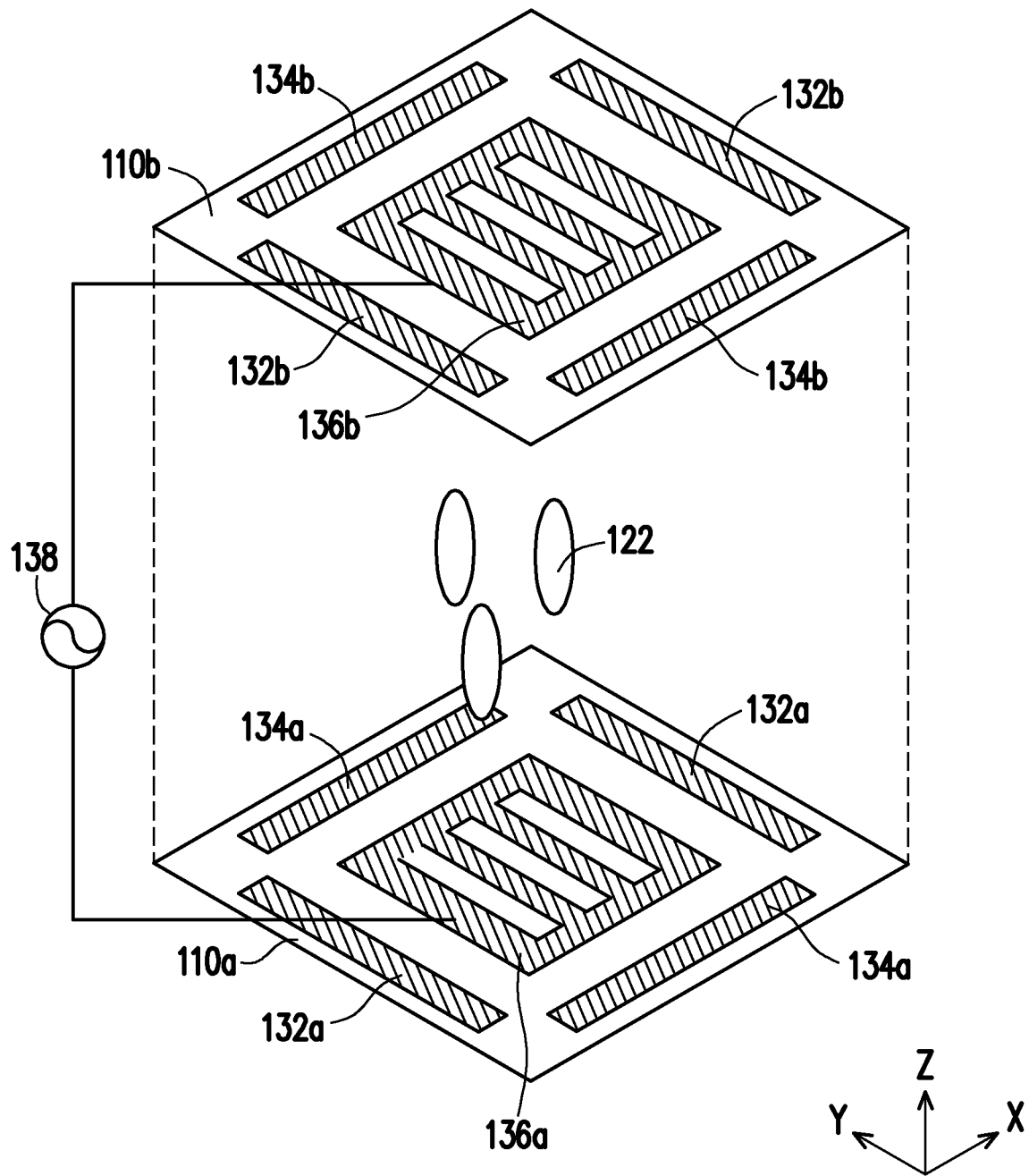
FIG. 5A is a schematic three-dimensional view of a liquid crystal pixel element.
Figure 5B:
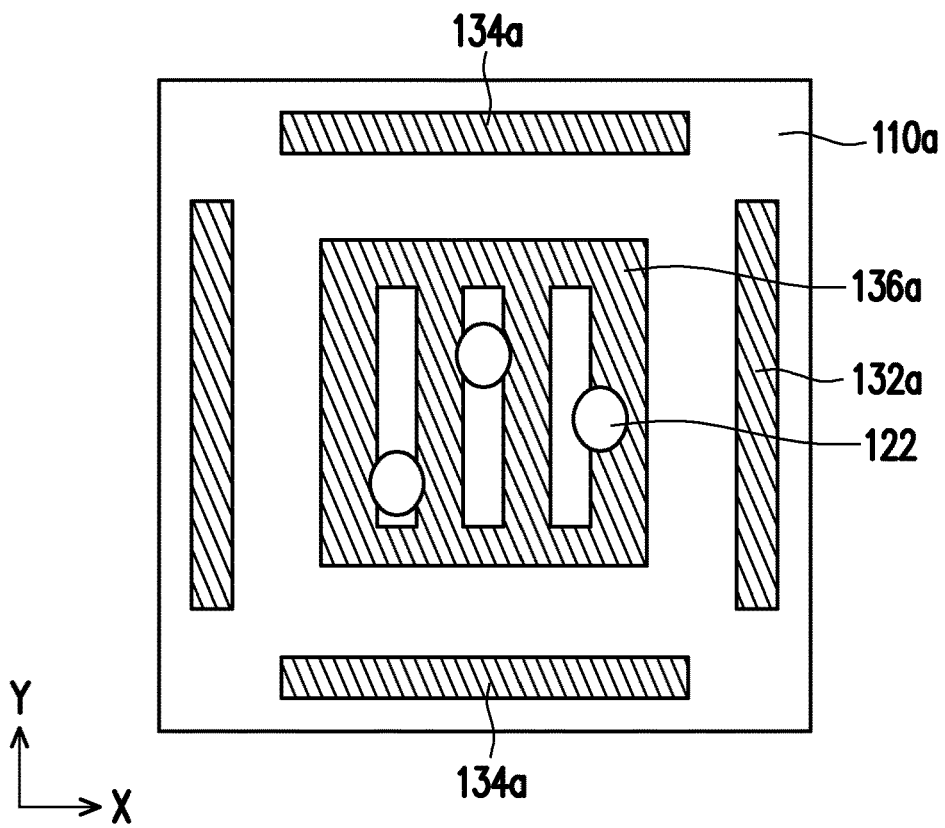
FIG. 5B is a schematic top view of the liquid crystal pixel element of FIG. 5A.
Figure 5C:
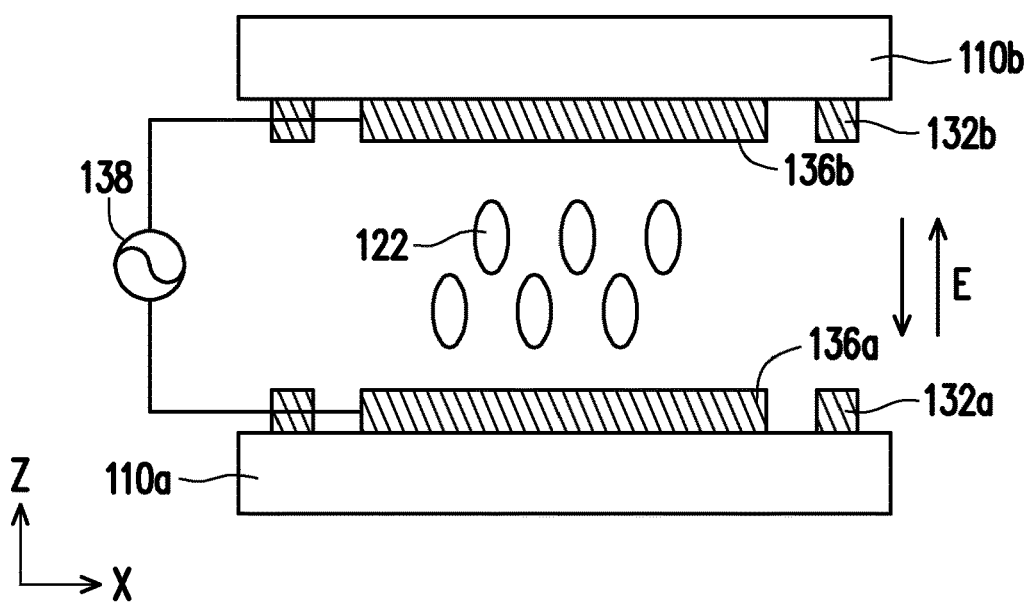
FIG. 5C is a schematic cross-sectional view of the liquid crystal pixel element of FIG. 5A.

FIG. 5A is a schematic three-dimensional view of a liquid crystal pixel element. FIG. 5B is a schematic top view of the liquid crystal pixel element of FIG. 5A. FIG. 5C is a schematic cross-sectional view of the liquid crystal pixel element of FIG. 5A.

Please refer to FIG. 5A, FIG. 5B, and FIG. 5C. In this embodiment, a power source 138 is connected to the electrode 136a on the first substrate 110a, and the electrode 136b on the second substrate 110b. When applying a voltage difference between the electrode 136a and the electrode 136b, the electrode 136a and the electrode 136b generates an out-of-plane electric field substantially perpendicular to the first substrate 110a, the second substrate 110b and the liquid crystal layer 120. The electric field generated by the electrode 136a and the electrode 136b is perpendicular to the electric field generated by the pair of electrodes 132a and perpendicular to the electric field generated by the pair of electrodes 134a. The electric field generated by the electrode 136a and the electrode 136b may be along the positive or negative Z-direction which reorients the liquid crystal molecules 122 in the liquid crystal layer 120 along the same direction.

As a result, by applying a voltage difference to the electrode 136a and the electrode 136b, the liquid crystal molecules 122 in the liquid crystal layer 120 are reoriented along the generated electric fields, which is along the positive or negative Z-direction. In general, the average orientation direction of the liquid crystal molecules 122 is along the positive or negative Z-direction.

Figure 6:
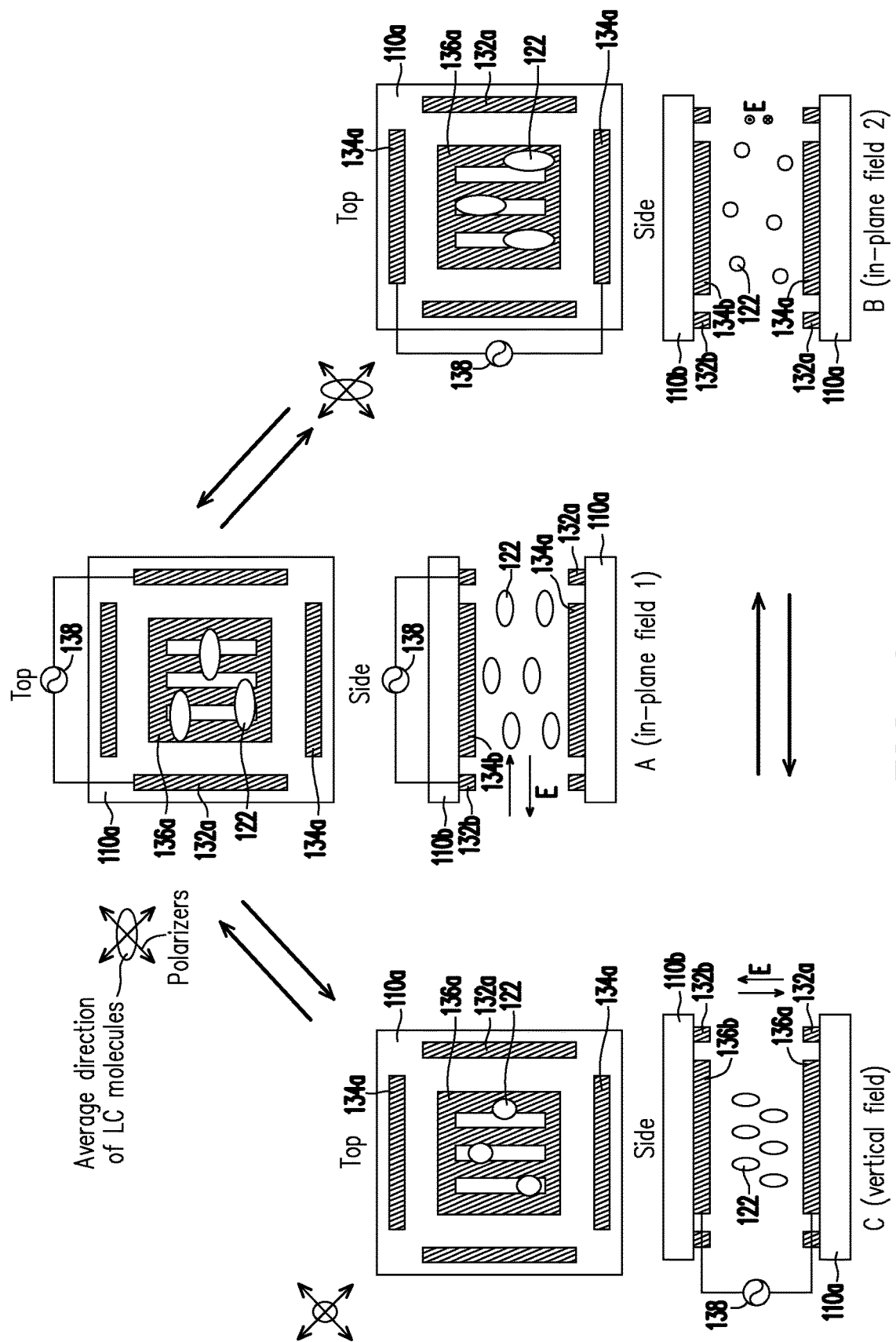
FIG. 6 are schematic top-views and cross-sectional views of the liquid crystal pixel elements of FIG. 3A, FIG. 4A and FIG. 5A.

As a result, by applying voltage differences to the electrodes 132a, 132b, 134a, 134b, 136a, and/or 136b on the first substrate 110a and the second substrate 110b, electric fields along three orthogonal directions (positive or negative X-direction, positive or negative Y-direction, and positive or negative Z-direction) may be generated to reorient the liquid crystal molecules 122 in the liquid crystal layer along the desired directions. As shown in FIG. 6, the orientation of the liquid crystal molecules 122 between X-, Y- and Z-directions may also be switched by applying proper voltage difference to the corresponding electrodes. With different orientation of the liquid crystal molecules, the phases of the incoming THz waves incident the liquid crystal pixel element may be retarded to the desired phase.

In the previous discussions, the liquid crystal molecules 122 with positive dielectric anisotropy (Δε>0) are used. However, when liquid crystal molecules 122 with negative dielectric anisotropy (Δε<0) are used, when applying the electric field to the liquid crystal layer, orientations of the liquid crystal molecules are 90 degrees different from those liquid crystal molecules with positive dielectric anisotropy (Δε>0).

As shown in FIG. 2A to 5C, the thickness of the liquid crystal layer 120 is between 50-150 μm, and preferably 100 μm or less, but is not limited to thereto. In some embodiments, the liquid crystal pixel element 100 become more effective when the thickness of the liquid crystal layer 120 is less than 100 μm. Even less thickness of the liquid crystal layer 120 is preferable in terms of low-loss phase shifters. Furthermore, for the purpose of low-loss phase shifters, the material of the substrates 110a and 110b of the liquid crystal pixel element 100 may be low-loss materials such as fused quarts quartz, silica, lithium niobate, and others, which are not limited thereto. By using low-loss substrate materials in the liquid crystal pixel element, the overall thickness of the liquid crystal pixel element 100 may be further reduced. In some embodiments, the disclosed liquid crystal devices can be combined with azimuthally rotatable birefringent substrates such as quarts quartz, silica, lithium niobate, which are not limited thereto. The birefringent substrates compensate phase shifts, which enables reducing the thickness of the liquid crystal layer in the disclosed liquid crystal device while maintaining the maximum phase shift as a phase shifter.

In other inventions, changes in the orientational direction of liquid crystal molecules are limited to a value of approximately 90 degrees or less, which are typically achieved in-plane or between an in-plane direction and an out-of-plane direction. However, the liquid crystal pixel element 100, as shown in FIGS. 3A to 5C, enables creating three 90-degree changes in the orientational directions of liquid crystal molecules 122 in space, which are achieved in XY, XZ, and XZ planes, depending on the electric fields applied to the liquid crystal layer. As a result, three pairs of bidirectional 90-degree switching are realized. Therefore, by combining a pair of polarizers 160a and 160b, the range of phase change accompanying the orientations of the liquid crystal molecules 122 becomes nonlinearly large as compared with the conventional techniques. Further, each switching in each 90-degree orientational direction are bidirectionally governed by electric fields, indicating that all responses of orientational changes are tunable and faster than those in conventional techniques.

The electrodes on the substrates may have various arrangements to suit various requirements. In FIG. 7A to FIG. 11B, various arrangements of the electrodes are presented. In these figures, since the arrangements of the electrodes 132a, 134a, and 136a on the first substrate 110a and the second substrate 110b are the same, only the arrangements of the electrodes 132a, 134a, and 136a on the first substrate 110a is presented and discussed below.

Figure 7A:
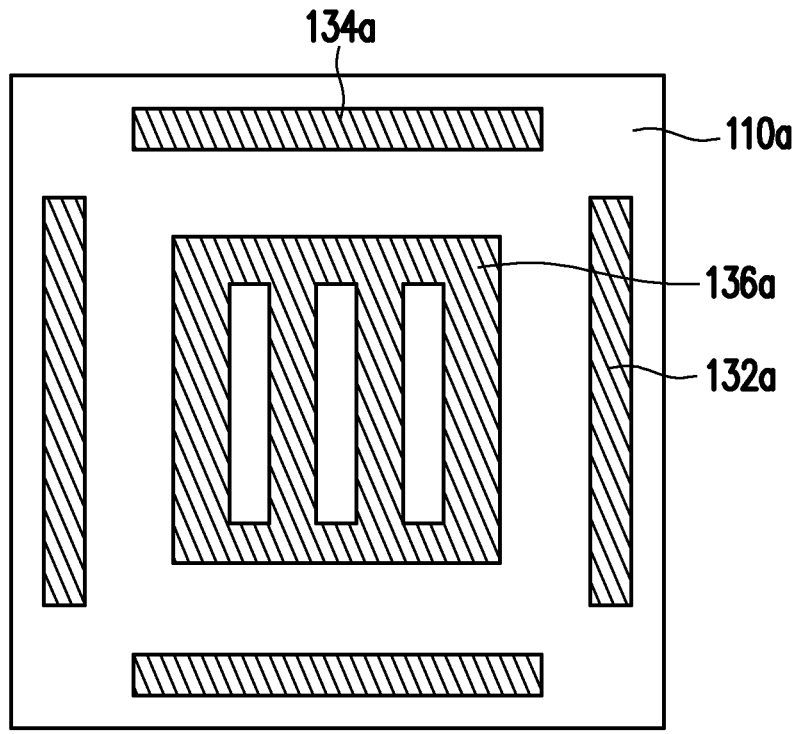
FIG. 7A is a schematic top view of a portion of a liquid crystal pixel element.
Figure 7B:
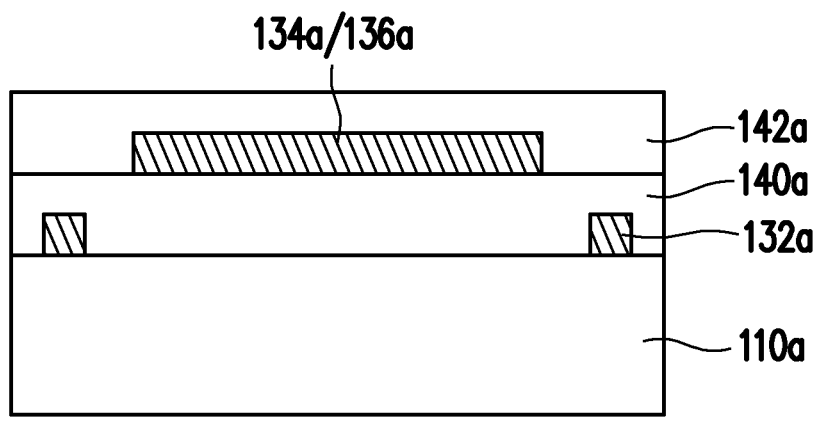
FIG. 7B is a schematic cross-sectional view of the portion of the liquid crystal pixel element of FIG. 7A.

FIG. 7A is a schematic top view of a portion of a liquid crystal pixel element. FIG. 7B is a schematic cross-sectional view of the portion of the liquid crystal pixel element of FIG. 7A. For the purpose of clarity, only the elements formed on the first substrate 110a are presented. The electrodes formed on the second substrate 110b are arranged similarly. Referring to FIG. 7A, from the top view, the arrangements of electrodes 132a, 134a, and 136a is the same as shown in FIG. 2B. However, as shown in FIG. 7B, only the electrodes 132a are formed on the substrate 110a. The electrodes 132a are covered with an insulating layer 140a. The electrodes 134a and 136a are formed on the insulating layer 140a. The electrodes 134a and 136a are covered with an insulating layer 142a. In other words, the electrodes 134a and 136a are formed on a same plane, but on a plane different from the plane which the electrodes 132a are formed. By arranging the electrodes in different planes, the wiring to the electrodes may be easier, and the shape of the electrodes may be more flexible since more space are available in one plane. In some embodiments, the thickness of the insulating layers 140a and 142a is 200-1000 nm, preferably 500 nm, but is not limited thereto. In some embodiments, the thickness of the electrodes 132a, 134a, and 136a is 100-500 nm, preferably 200 nm, but is not limited thereto. The width of the electrodes 130a and 130b is between 5-15 μm, and preferably but is not limited thereto.

Figure 8A:
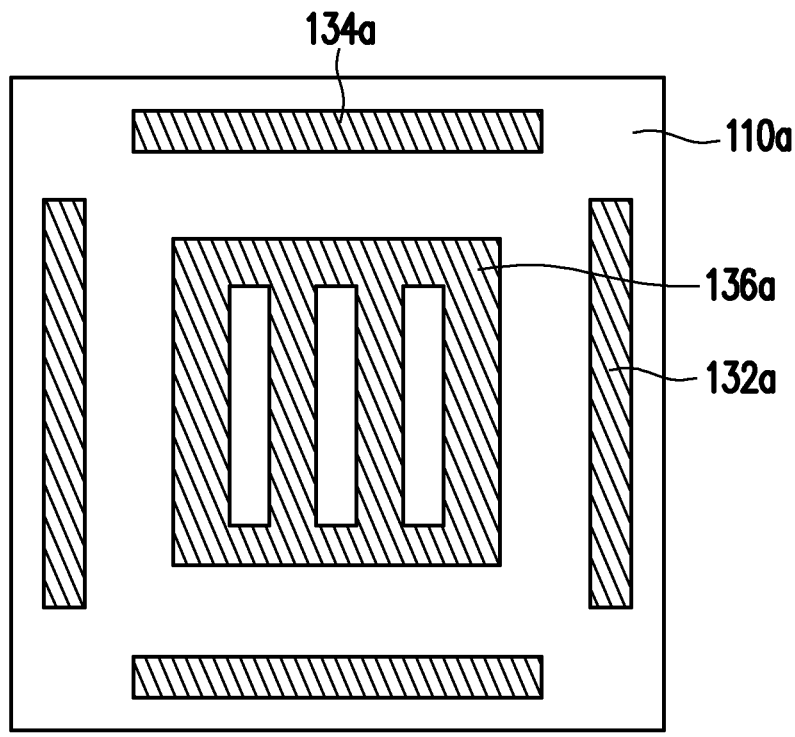
FIG. 8A is a schematic top view of a portion of a liquid crystal pixel element.
Figure 8B:
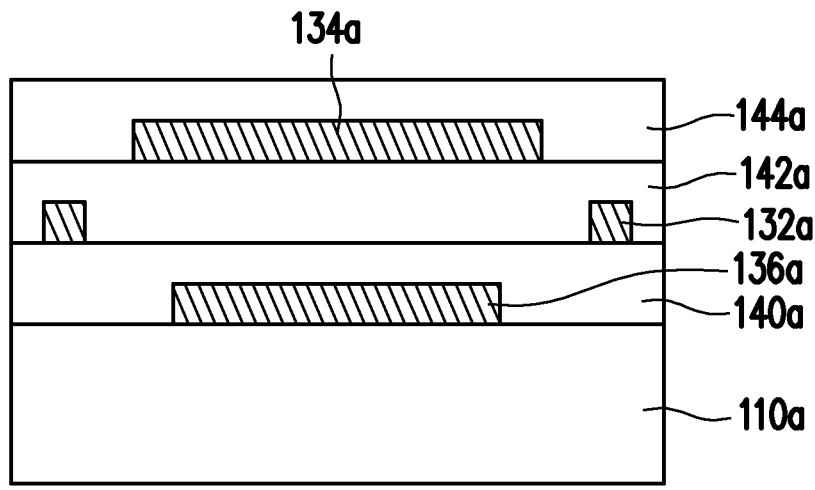
FIG. 8B is a schematic cross-sectional view of the portion of the liquid crystal pixel element of FIG. 8A.

FIG. 8A is a schematic top view of a portion of a liquid crystal pixel element. FIG. 8B is a schematic cross-sectional view of the portion of the liquid crystal pixel element of FIG. 8A. Referring to FIG. 8A, from the top view, the arrangement of electrodes 132a, 134a, and 136a is the same as shown in FIG. 7A. However, as shown in FIG. 8B, only the electrode 136a is formed on the substrate 110a. The electrode 136a is covered with an insulating layer 140a. The electrodes 132a are foamed on the insulating layer 140a. The electrodes 132a are covered with an insulating layer 142a. The electrodes 134a are formed on the insulating layer 142a. The electrodes 136a are further covered with an insulating layer 144a. In other words, the electrodes 132a, 134a and 136a are each formed on a different plane. In some embodiments, the electrodes 132a, 134a and 136a may formed on layers different from what is shown in FIG. 8B, which is not limited thereto. By arranging the electrodes in different planes, the wiring to the electrodes may be easier, and the shape of the electrodes may be more flexible since more space are available in one plane. In some embodiments, the thickness of the insulating layers 140a and 142a is 200-1000 nm, preferably 500 nm, but is not limited thereto. In some embodiments, the thickness of the electrodes 132a, 134a, and 136a is 100-500 run, preferably 200 nm, but is not limited thereto. The width of the electrodes 130a and 130b is between 5-15 μm, and preferably 10 μm, but is not limited thereto.

Figure 9A:
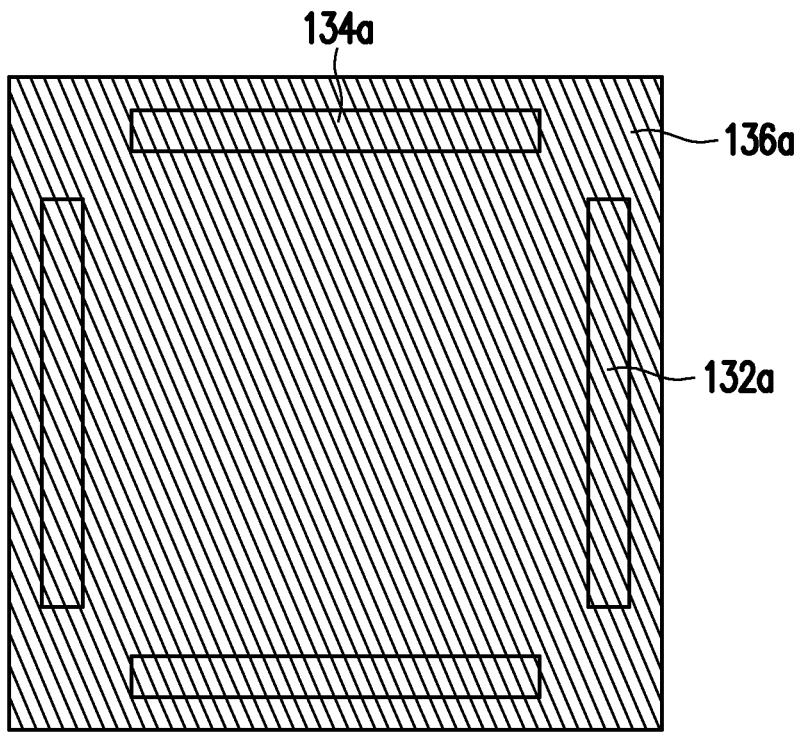
FIG. 9A is a schematic top view of a portion of a liquid crystal pixel element.
Figure 9B:
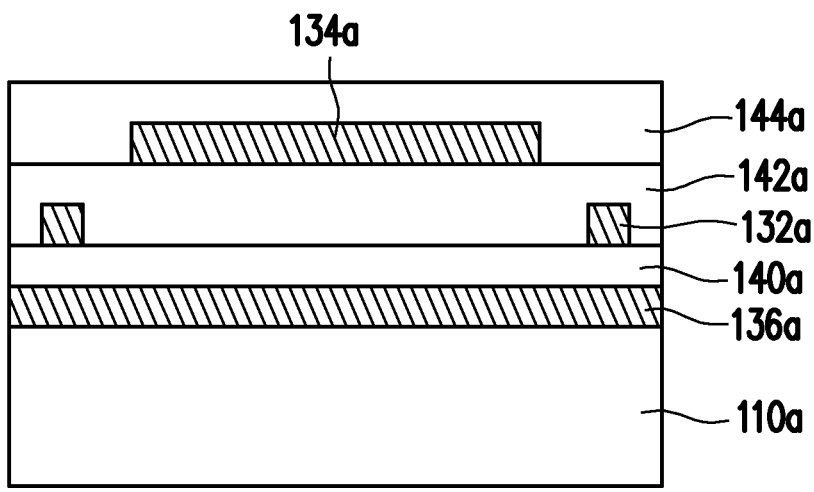
FIG. 9B is a schematic cross-sectional view of the portion of the liquid crystal pixel element of FIG. 9A.

FIG. 9A is a schematic top view of a portion of a liquid crystal pixel element. FIG. 9B is a schematic cross-sectional view of the portion of the liquid crystal pixel element of FIG. 9A. The arrangements of the electrodes 132a and 134a in FIG. 9A and FIG. 9B are similar to the arrangement of the electrodes 132a and 134a in FIG. 8A. The differences in FIG. 9A and FIG. 9B are that the electrode 136a extends over the top surface of the first substrate 110a below the electrodes 132a and 134a. With similar arrangement of the electrode 136b formed on the second substrate 110b (not shown), the electrode 136a and 136b may form a more uniform electric field along the Z-direction, so the out-of-plane electric field generated in the liquid crystal layer 120 may be more uniform.

Figure 10A:
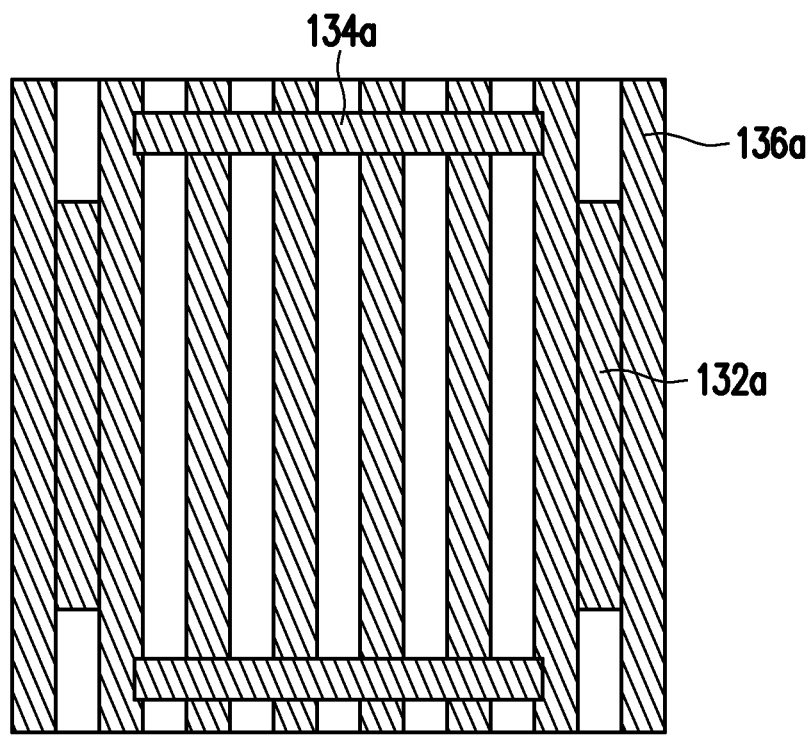
FIG. 10A is a schematic top view of a portion of a liquid crystal pixel element.
Figure 10B:
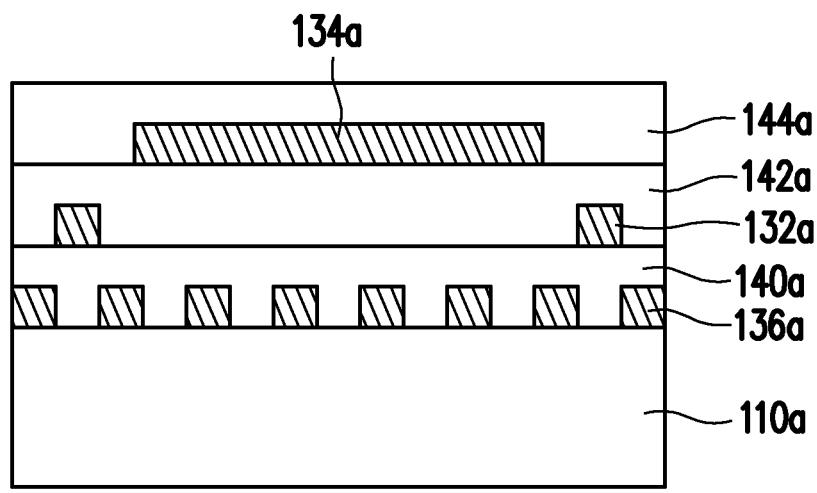
FIG. 10B is a schematic cross-sectional view of the portion of the liquid crystal pixel element of FIG. 10A.

FIG. 10A is a schematic top view of a portion of a liquid crystal pixel element. FIG. 10B is a schematic cross-sectional view of the portion of the liquid crystal pixel element of FIG. 10A. The arrangements of the electrodes 132a and 134a in FIG. 10A and FIG. 10B are similar to the arrangements of the electrodes 132a and 134a in FIG. 9A and FIG. 9B. The difference in FIG. 10A and FIG. 10B is that, instead of a grating-type electrode, the electrode 136a is now a plurality of finger-type electrodes extending along the Y-direction. In some embodiments, each of the finger-type electrodes has a same width in the X-direction. In some embodiments, the gaps between the finger-type electrodes are the same. With similar arrangement of the electrode 136b formed on the second substrate 110b (not shown), the electrode 136a and 136b may form a periodically varying electric field along the Z-direction.

Figure 11A:
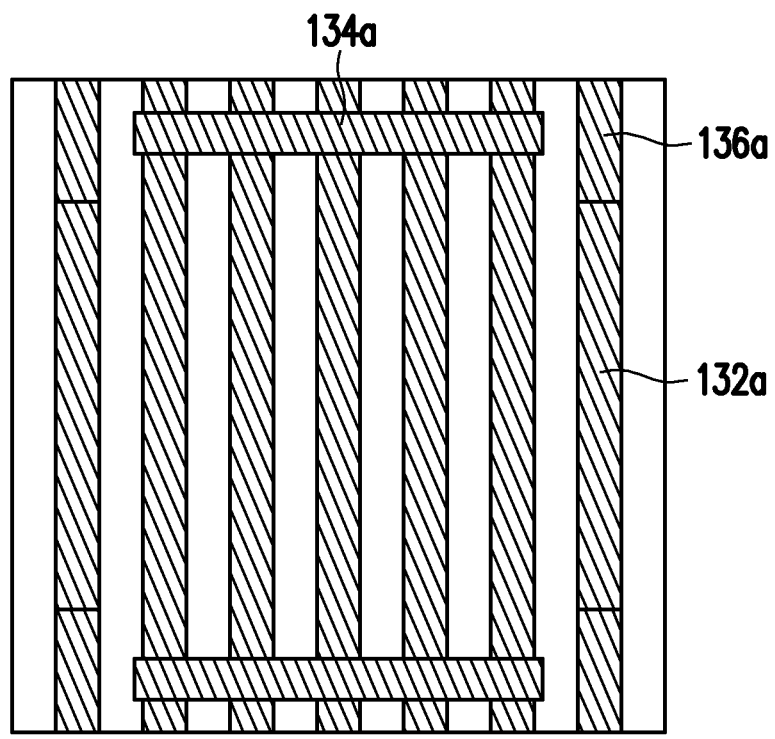
FIG. 11A is a schematic top view of a portion of a liquid crystal pixel element.
Figure 11B:
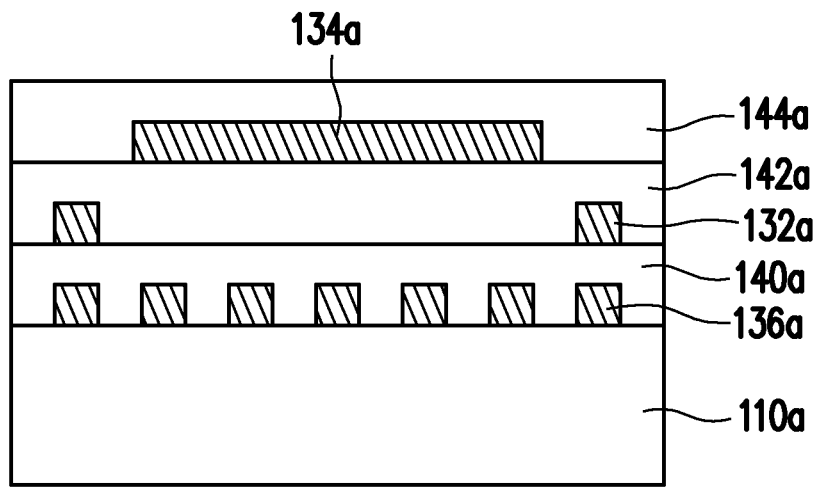
FIG. 11B is a schematic cross-sectional view of the portion of the liquid crystal pixel element of FIG. 11A.

FIG. 11A is a schematic top view of a portion of a liquid crystal pixel element. FIG. 11B is a schematic cross-sectional view of the portion of the liquid crystal pixel element of FIG. 11A. The arrangements of the electrodes 132a and 134a in FIG. 11A and FIG. 11B are similar to the arrangements of the electrodes 132a and 134a in FIG. 10A and FIG. 10B. The difference in FIG. 11A and FIG. 11B is that the finger-type electrodes 136a are now shifted along the X-direction such that from the top view, the electrodes 132a and the electrodes 136a are now overlapped, instead of not overlapping each other as shown in FIG. 10A and FIG. 10B.

With various arrangement of the electrodes, a variety of electric fields in the liquid crystal layer 120 may be generated according to the desired purpose.

Figure 12:
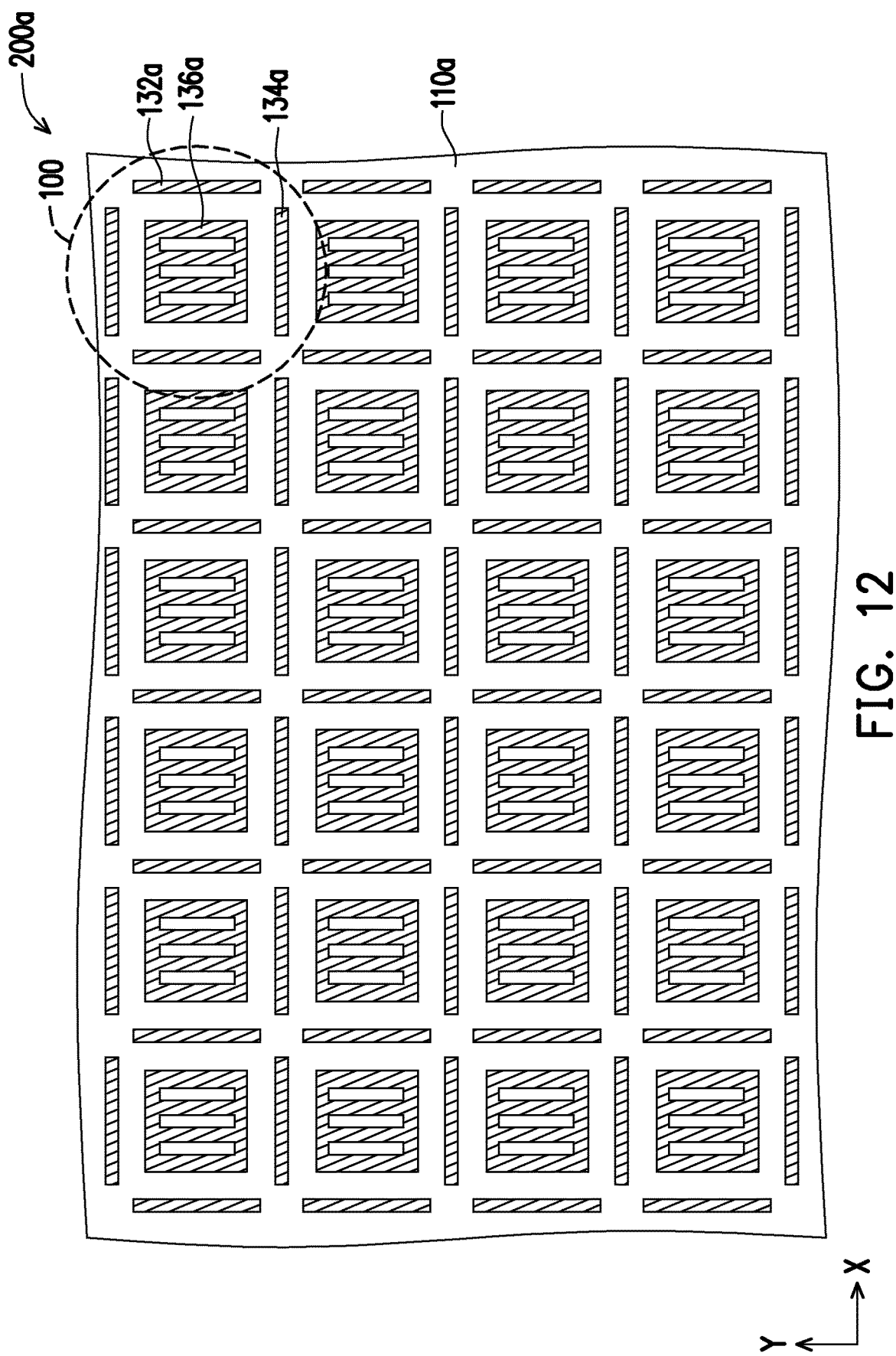
FIG. 12 is a schematic top view of a portion of a liquid crystal device.

FIG. 12 is a schematic top view of a portion of a liquid crystal device 200a. For the purpose of clarity, only the electrodes on the first substrate 110a are presented. The electrodes formed on the second substrate 110b are arranged similarly. The liquid crystal device 200a is formed by an array of liquid crystal pixel elements 100. In the liquid crystal device 200a, the electrodes 132a are shared with the neighboring liquid crystal pixel elements in the X-direction, and the electrodes 134a are shared with the neighboring liquid crystal pixel elements in the Y-direction. The electrode 136a of the liquid crystal pixel element 100 is not shared by neighboring liquid crystal pixel elements.

As shown in FIG. 12, an array of the liquid crystal pixel elements 100 in the liquid crystal device 200a enables enlarging the area for beam shaping with phase shift. Even if a single liquid crystal pixel element may be too small for THz beam, forming a liquid crystal device using arrays of the liquid crystal pixel elements of this disclosure enables enlarging the area for THz beam exposure.

Figure 13:
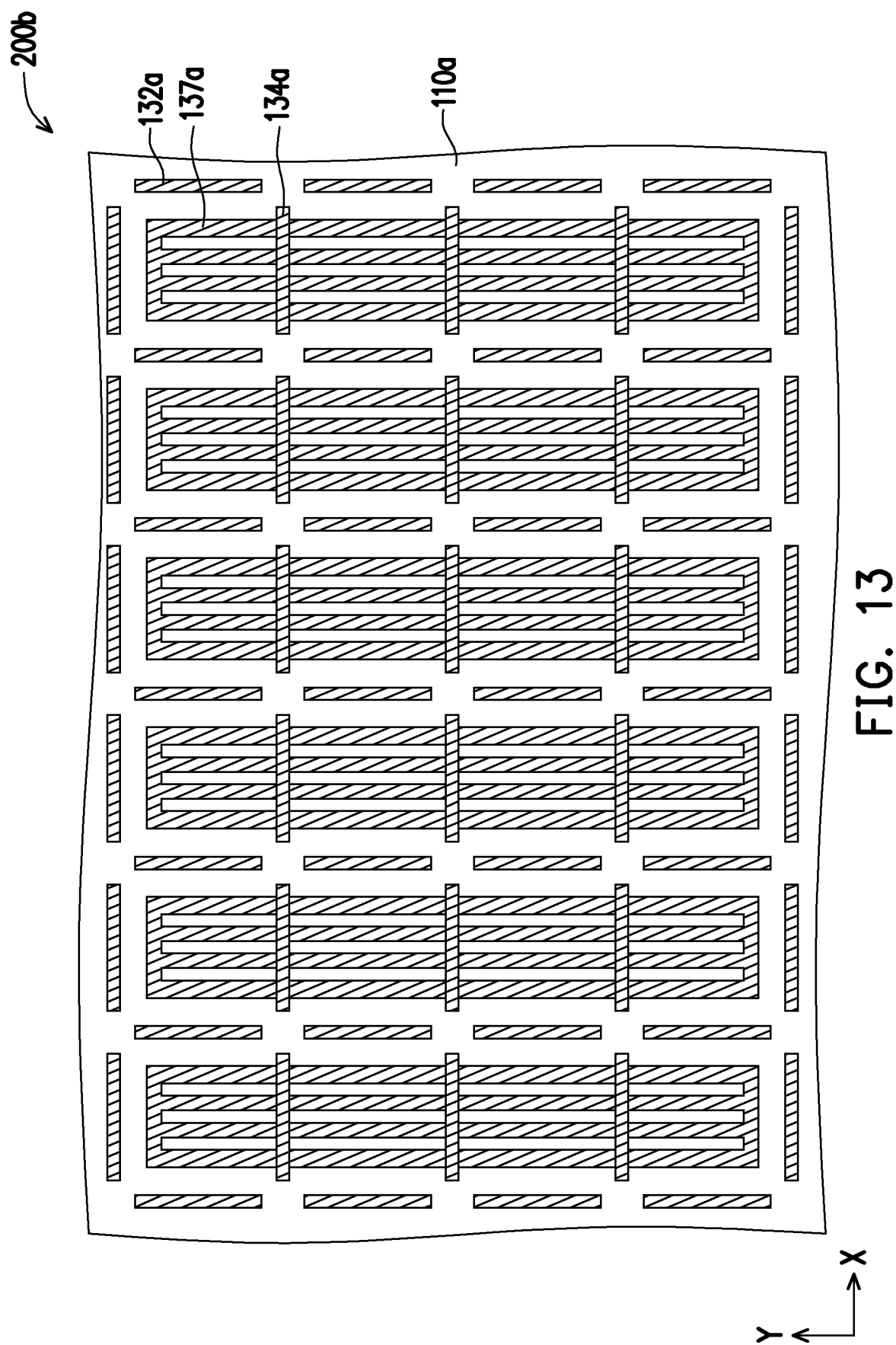
FIG. 13 is a schematic top view of a portion of a liquid crystal device.

FIG. 13 is a schematic top view of a portion of another liquid crystal device 200b. For the purpose of clarity, only the electrodes formed on the first substrate 110a are presented. The electrodes formed on the second substrate 110b are arranged similarly. The arrangement of the electrodes 132a and 134a are similar to the arrangement shown in FIG. 12. The difference is that the electrode 136a in FIG. 12 is now merged with the electrode 136a in the neighboring liquid crystal pixel elements along the Y-direction to form a new electrode 137a. As shown in FIG. 13, the electrode 137a is now shared by several liquid crystal pixel elements along the Y-direction. The number of liquid crystal pixel elements which share an electrode 137a depends on the desired purpose, which is not limited thereto. In some embodiments, the electrode 137a may extend along the X-direction.

Figure 14:
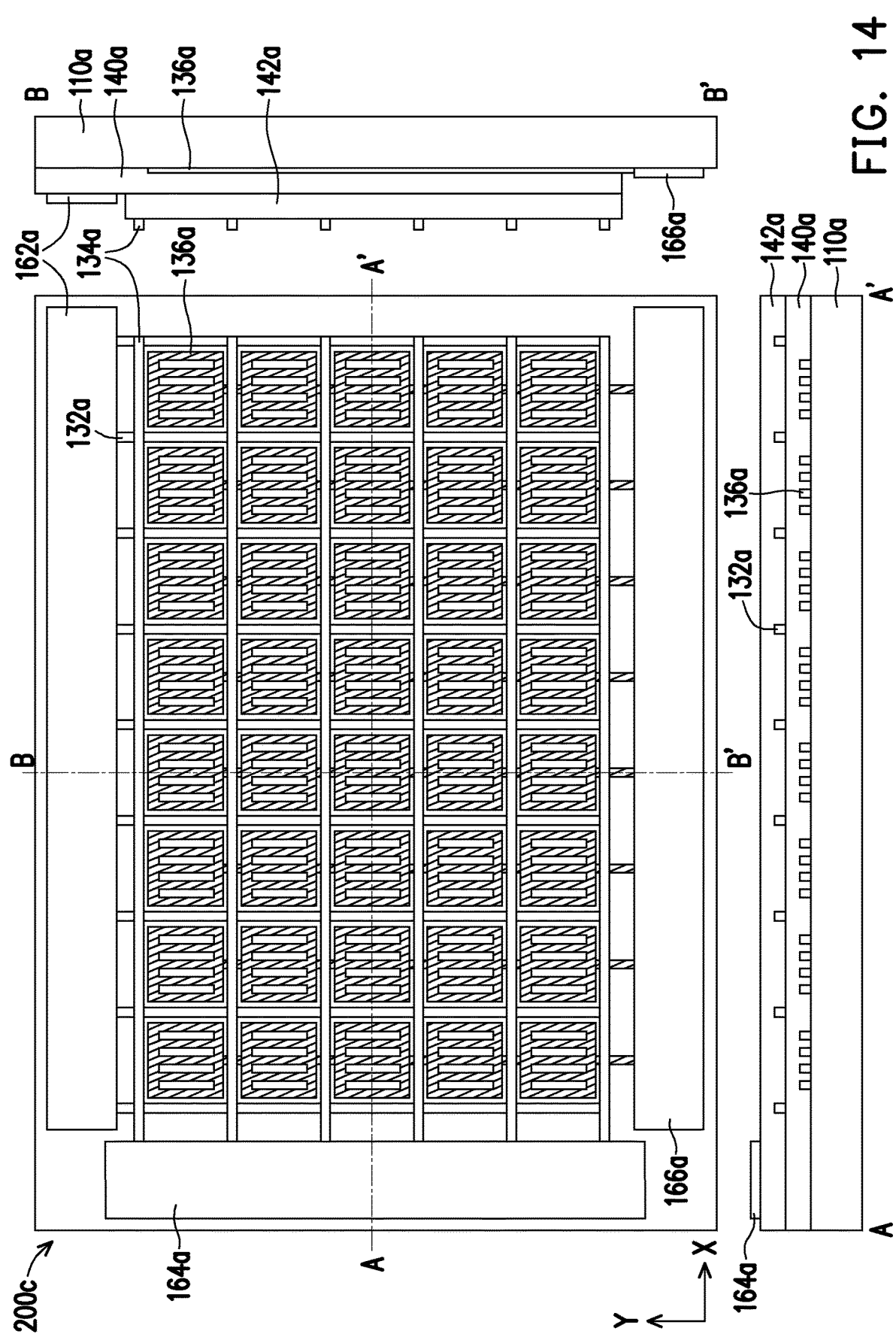
FIG. 14 are a schematic top view and cross-sectional views of a portion of a liquid crystal device.

FIG. 14 are a schematic top view and cross-sectional views of a portion of a liquid crystal device 200c. For the purpose of clarity, only the electrodes formed on the first substrate 110a are presented. The electrodes formed on the second substrate 110b are arranged similarly. The liquid crystal device 200c shown in FIG. 14 is similar to the liquid crystal device 200a shown in FIG. 12. The difference is that, in FIG. 14, the liquid crystal device 200c further includes driving modules 162a, 164a and 166a connecting to the electrodes 132a, 134a and 136a respectively. The driving modules 162a, 164a and 166a control the electrodes 132a, 134a and 136a to generate the electric fields in the three orthogonal directions. In the cross-section view along the line AA', the electrode 136a is formed on the substrate 110a, and is covered with an insulating layer 140a. The electrodes 132a are formed on the insulating layer 140a, and is covered with an insulating layer 142a. The driving module 164a is formed on the insulating layer 142a. In the cross-section view along the line BB', the driving module 166a is formed on the substrate 110a and connects with the electrode 136a. The driving module 162a is formed on the insulating layer 140a. The electrodes 134a are formed on the insulating layer 142a. In some embodiments, the thickness of the insulating layers 140a and 142a is 200-1000 nm, preferably 500 nm, but is not limited thereto. In some embodiments, the thickness of the electrodes 132a, 134a, and 136a is 100-500 nm, preferably 200 nm, but is not limited thereto. The width of the electrodes 130a and 130b is between 5-15 µm, and preferably 10 µm, but is not limited thereto.

With the arrangement shown in FIG. 14, the driving module 162a, 164a and 166a may supply a voltage difference to electrodes 132a, 134a, and 136a respectively, which may generate the electric field along the desired direction in the liquid crystal layer.

To operate the arrays of the liquid crystal pixel elements in the liquid crystal device 200c, each liquid crystal element is provided with the same potential via the electrodes, such as electrodes 132a, 134a, and 136a, such that uniform liquid crystal orientation is achieved throughout the entire array of pixels. Driving modules 162a, 164a, 166a which provide such uniform electric signals, are much simpler than those in liquid crystal displays. Overlapping an electrode with another electrode via an insulating layer works as a capacitor, which can be added to the capacitor formed by liquid crystal layer in the liquid crystal pixel element. When each element is operated via a thin film transistor (not shown), the added capacitor from the layered electrodes has an advantage in holding voltage characteristics in the liquid crystal pixel element. When holding voltage characteristics is good, various types of liquid crystals with different properties, such as large dielectric anisotropy, low resistivity, low absorption loss may be used in the liquid crystal layer.

Figure 15:
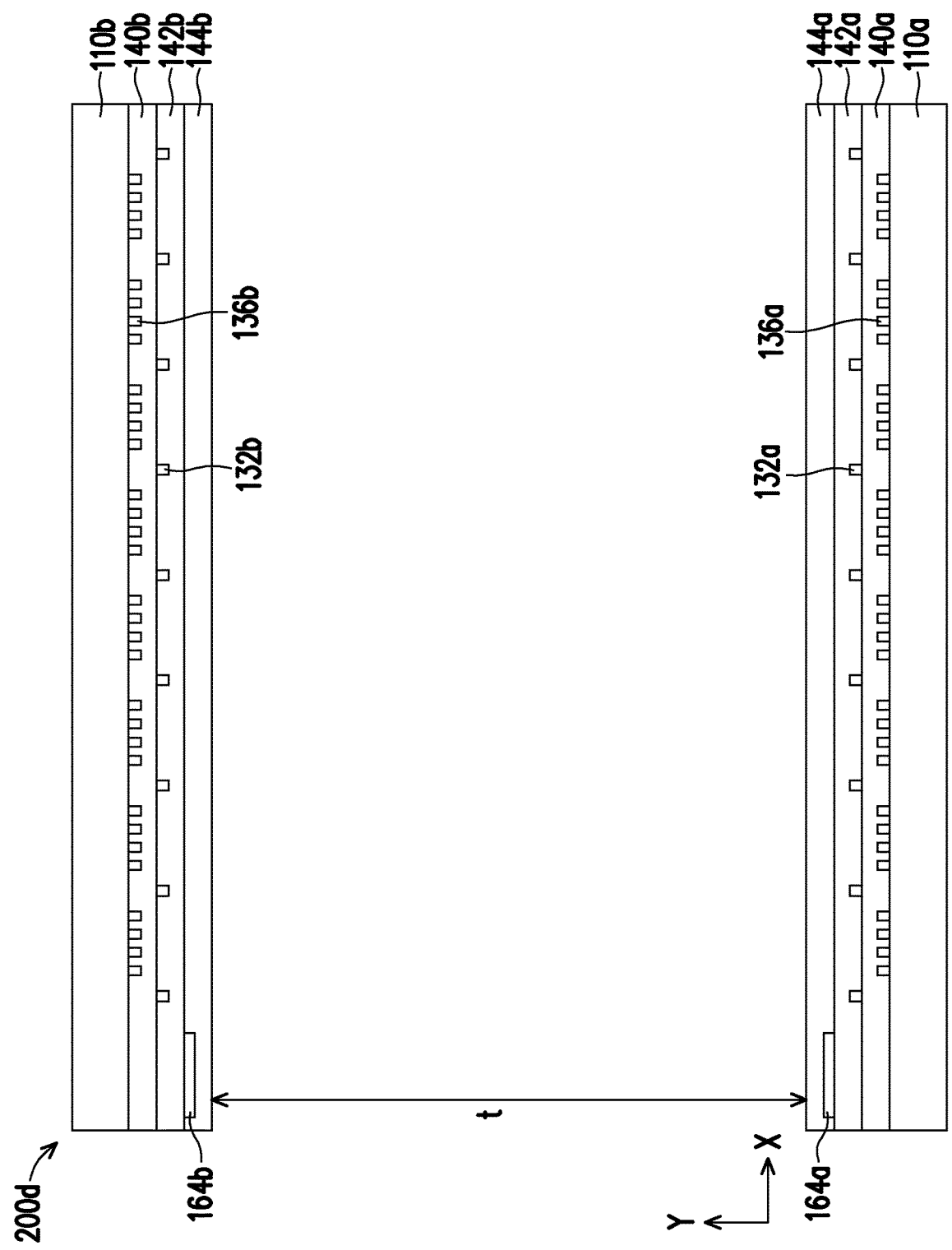
FIG. 15 is a cross-sectional view of a portion of a liquid crystal device.

FIG. 15 is a cross-sectional view of a portion of a liquid crystal device 200d. The liquid crystal device 200d has a first substrate 110a with the structure shown in the cross-section of the liquid crystal device 200c along line AA' in FIG. 14. The liquid crystal device 200d has a second substrate 110b facing the first substrate 110a with the same structure of the first substrate 110a. The first substrate 110a and the second substrate 110b are separated by a cell gap. The cell gap is a distance between the top surface of the insulating layer 144a and the top surface of the insulating layer 144b. In some embodiments, a thickness of the cell gap, t, is 50-150 µm, and preferably 100 µm or less, but is not limited thereto.

Figure 16:
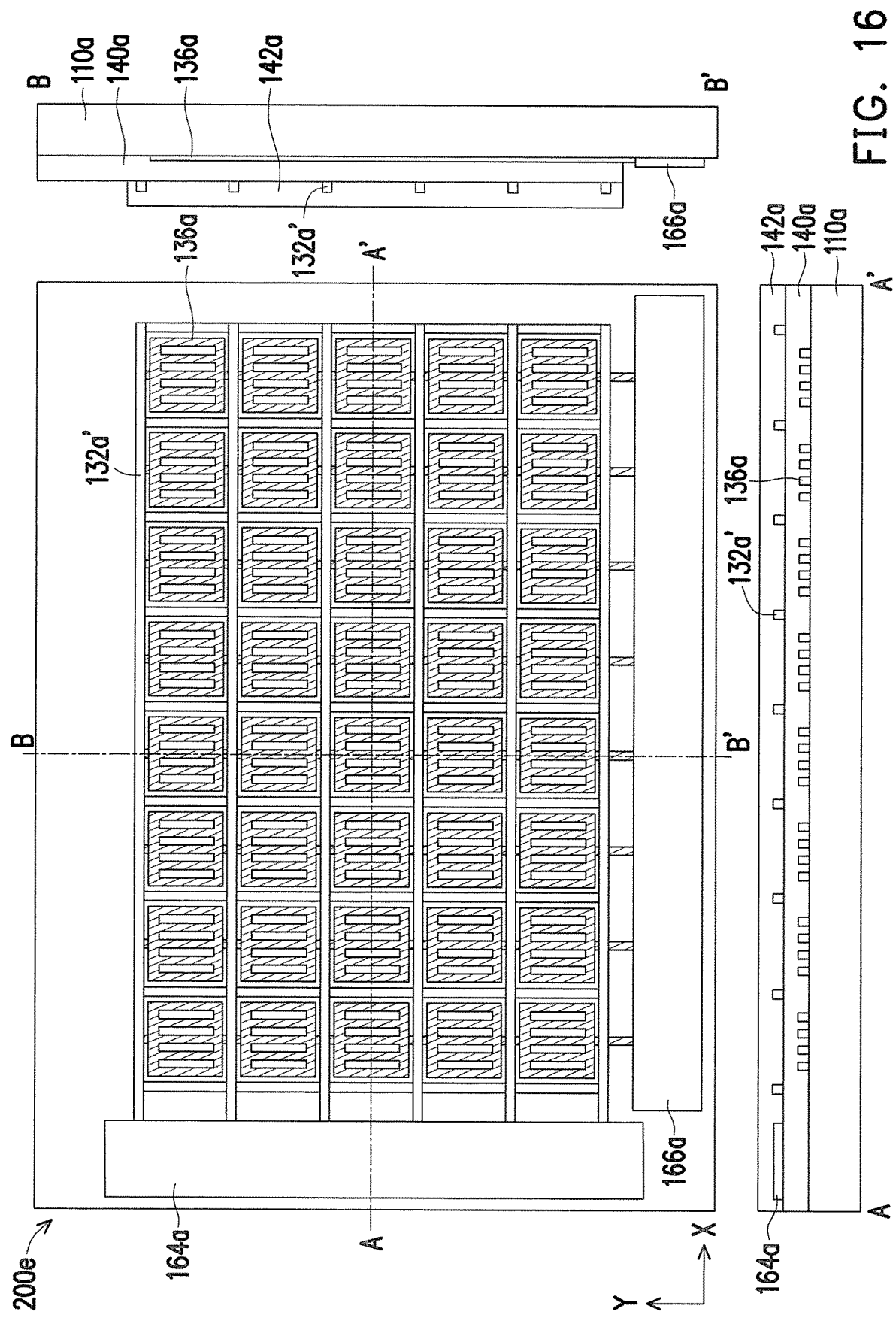
FIG. 16 are a schematic top view and cross-sectional views of a portion of a liquid crystal device.

FIG. 16 are a schematic top view and cross-sectional views of a portion of a liquid crystal device 200e. The liquid crystal device 200e shown in FIG. 16 is similar to the liquid crystal device 200c shown in FIG. 14. The difference is that, in FIG. 16, the horizontal finger-type electrodes 132a and the vertical finger-type electrodes 134a are connected as electrodes 132a', as shown in FIG. 16. The electrodes 132a' are connected with the driving module 164a. As shown in the cross-sectional views along lines AA' and BB', the electrodes 132a' and the driving module 164a are formed on the insulating layer 140a, and are covered by the insulating layer 142a. Compare to the liquid crystal device 200c shown in FIG. 14, the number of insulating layers is reduced from 3 to 2, which simplifies the overall structure of the liquid crystal device 200e.

However, since the vertical and horizontal finger-type electrodes 134a and 132a are connected as the electrodes 132a', the electric field generated by the electrodes 132a' is not completely along the X-direction or the Y-direction. As a result, the range of the orientation of the liquid crystal molecules becomes narrower in the liquid crystal device 200, and the liquid crystal device 200e does not have exact hexa-directional switching as the liquid crystal device 200c. In some embodiments the x and y dimensions of each pixel element is approximately the same.

Figure 17:
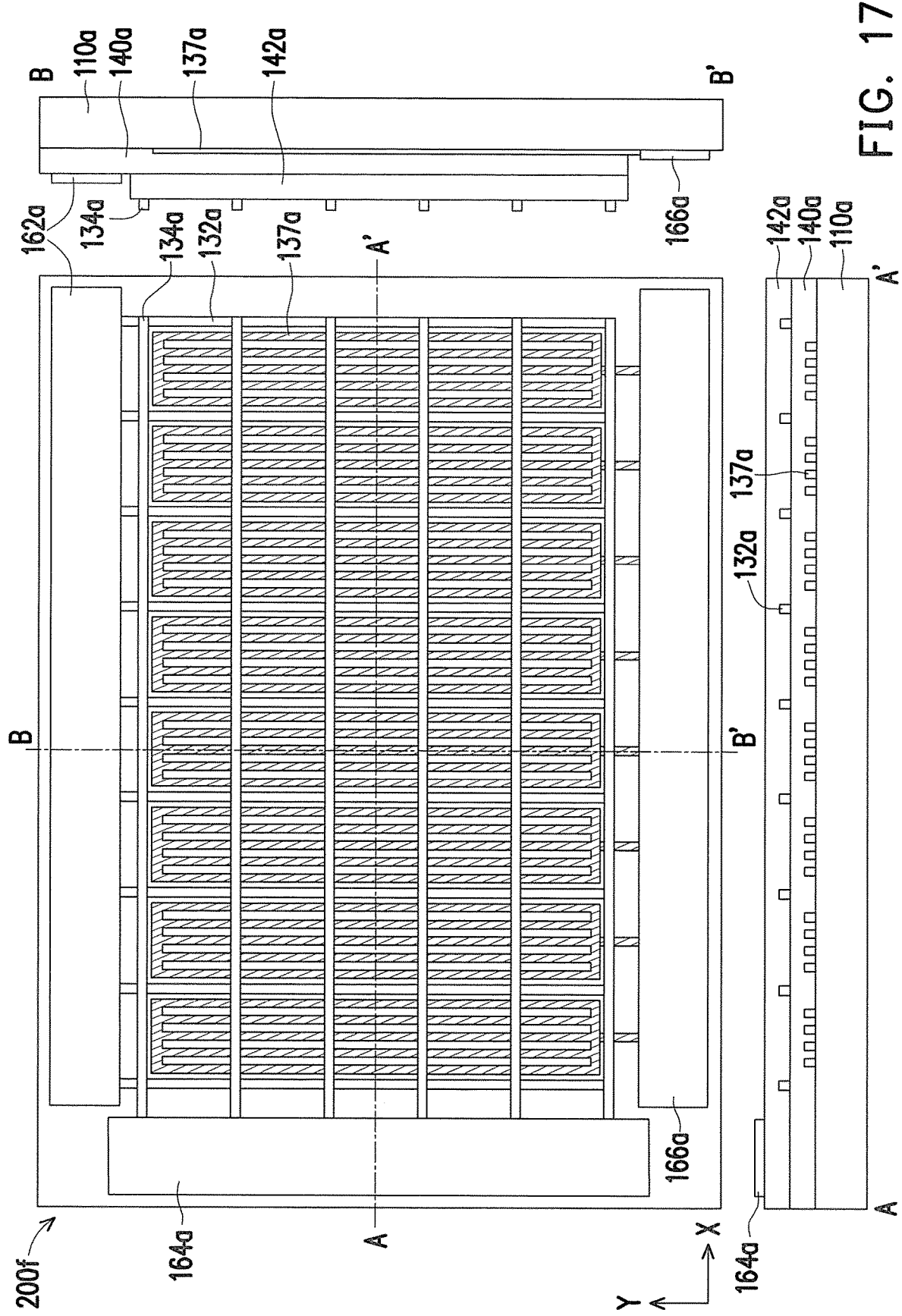
FIG. 17 are a schematic top view and cross-sectional views of a portion of a liquid crystal device.

FIG. 17 are a schematic top view and cross-sectional views of a portion of a liquid crystal device 200f For the purpose of clarity, only the electrodes formed on the first substrate 110a are presented. The electrodes formed on the second substrate 110b are arranged similarly. The liquid crystal device 200f shown in FIG. 17 is similar to the liquid crystal device 200c shown in FIG. 14. The difference is that, in FIG. 17, the electrodes 136a are replaced with the electrodes 137a as shown in FIG. 13. The driving module 166a is now connected with the electrodes 137a, which extends through several liquid crystal pixel elements along the Y-direction. With this arrangement, the driving module 166a may control the electric field in Z-direction for several liquid crystal pixel elements at the same time.

Figure 18:
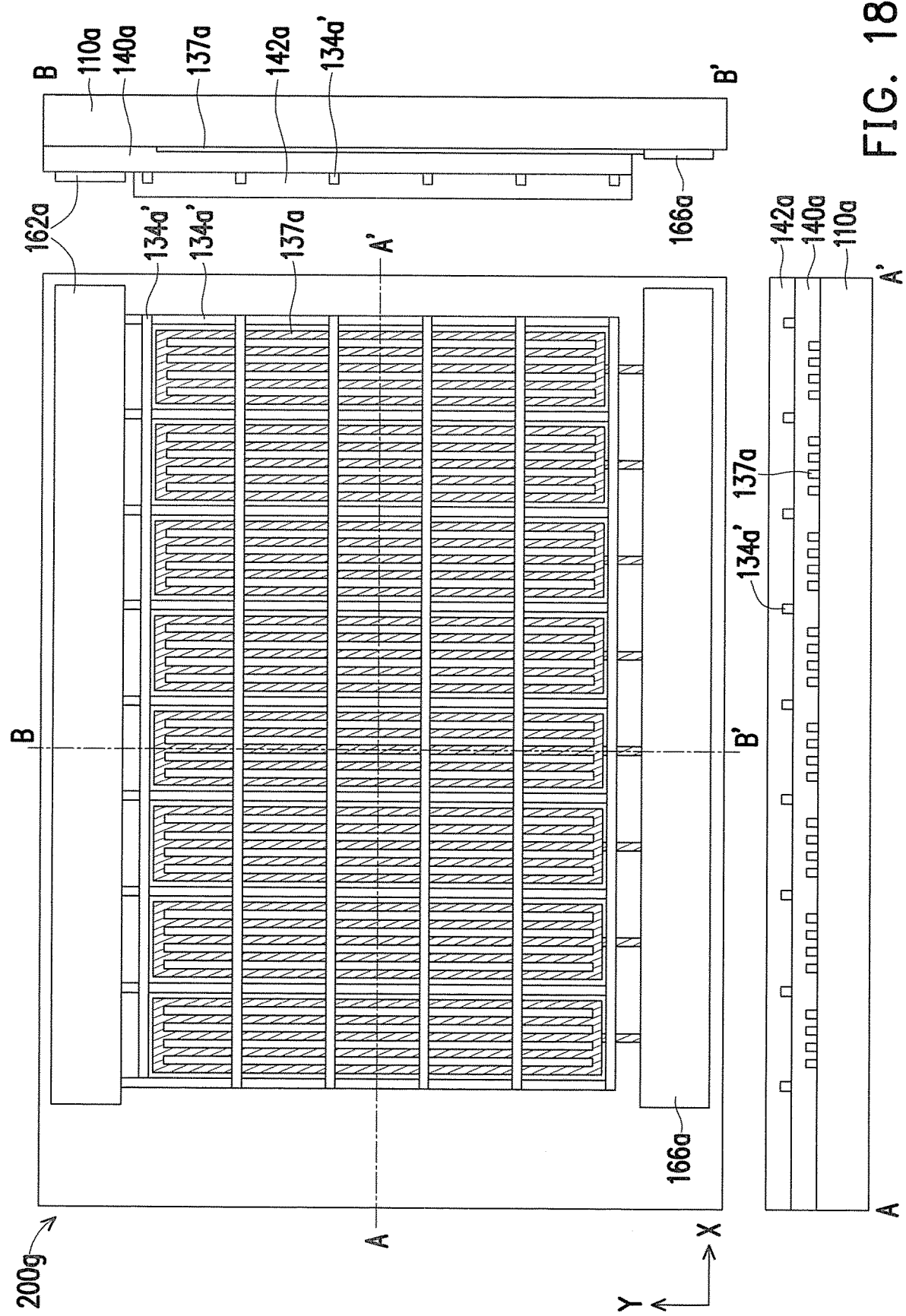
FIG. 18 are a schematic top view and cross-sectional views of a portion of a liquid crystal device.

FIG. 18 are a schematic top view and cross-sectional views of a portion of a liquid crystal device 200g. The liquid crystal device 200g shown in FIG. 18 is similar to the liquid crystal device 200f shown in FIG. 17. The difference is that, in FIG. 18, the horizontal finger-type electrodes 132a and the vertical finger-type electrodes 134a are connected as electrodes 134a', as shown in FIG. 18. The electrodes 134a' are connected with the driving module 162a. As shown in the cross-sectional views along lines AA' and BB', the electrodes 134a' and the driving module 162a are formed on the insulating layer 140a, and are covered by the insulating layer 142a. Compare to the liquid crystal device 200f shown in FIG. 17, the number of insulating layers is reduced from 3 to 2, which simplifies the overall structure of the liquid crystal device 200f.

Figure 19:
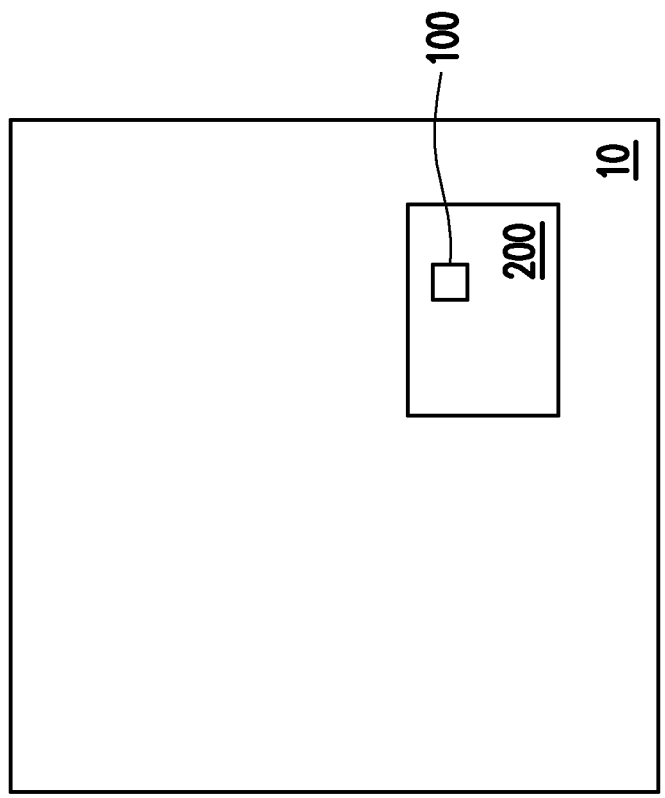
FIG. 19 is a block diagram of a photonic device for THz electromagnetic waves.

FIG. 19 is a block diagram of a photonic device for THz electromagnetic waves. As shown in FIG. 19, a photonic device 10 used for THz electromagnetic waves is presented. In some embodiments, the photonic device 10 is a polarizer, a filter, a phase shifter, or a modulator, or is a broadband wireless communication system, a security surveillance system, a medical imaging system, or a materials characterization system, which is not limited thereto. The photonic device 10 includes a liquid crystal device 200, which includes a plurality of liquid crystal pixel elements 100. In some embodiments, the liquid crystal device 200 includes the liquid crystal devices 200a, 200b, 200c, 200d, and/or 200e, described in this application, but is not limited thereto. With the three orthogonal directions of the electric fields in the liquid crystal pixel elements 100, the liquid crystal molecules in the liquid crystal pixel elements 100 may rotate to any directions according to the applied electric fields, which are suited for applications for THz electromagnetic waves applications.

The disclosed structures set forth above enable continuously switching of the orientation of the LC molecules between the initial, intrinsic in-plane, and out-of-plane states, thereby providing a wider range of phase shifts while maintaining a rapid response. Furthermore, mutual switching between the three orientation states of the LC molecules becomes possible using the three orthogonal electric fields generated by three pairs of electrodes. In other words, the disclosed structures effectively allow hexa-directional switching between the initial, intrinsic in-plane, and out-of-plane states. In principle, utilizing the three LC orientation states broadens the variations in phase shifts. Furthermore, switching between three LC orientation states by applying electric fields maintains a faster response time. The range of phase shifts afforded by the novel LC switching mode for THz devices such as phase shifters can potentially be further improved by optimizing some device and material parameters, including even larger retardation using LCs with greater birefringence.

The liquid crystal device disclosed here may have wide applications, such as integrated into a THz antenna arrays, or integrated into THz photonic crystals.

It will be apparent to those skilled in the art that various modifications and variations can be made to the disclosed embodiments. It is intended that the specification and examples be considered as exemplary only, with a true scope of the present disclosure being indicated by the following claims and their equivalents.

What is claimed is:

1. A liquid crystal device comprising:
   a single or a plurality of pixel elements, each pixel element comprising:
   a first substrate,
   a second substrate facing the first substrate and parallel to the first substrate,
   a liquid crystal layer disposed between the first substrate and the second substrate,
   a first plurality of electrodes formed between the first substrate and the liquid crystal layer, wherein the first plurality of electrodes is grating-type and/or finger-type electrodes,
   a second plurality of electrodes formed between the second substrate and the liquid crystal layer, wherein the second plurality of electrodes, is grating-type and/or finger-type electrodes, wherein the same grating-type and/or finger-type electrode of the first plurality of electrodes and the second plurality of electrodes are formed and facing each other with a cell gap,
   wherein the first plurality of electrodes and the second plurality of electrodes are composed to generate electric fields in three orthogonal directions, and the electric fields in two of the three orthogonal directions are in-plane electric fields and are substantially parallel to the first substrate, the second substrate and to the liquid crystal layer, while the other electric field of the three orthogonal directions is an out-of-plane electric field and is substantially perpendicular to the first substrate and the second substrate.

2. The liquid crystal device according to claim 1, wherein an initial alignment of liquid crystal molecules in the liquid crystal layer is nearly perpendicular from an extending direction of one of the grating-type and/or finger-type electrodes of the first plurality of electrodes and the second plurality of electrodes.

3. The liquid crystal device according to claim 2, wherein the initial alignment of the liquid crystal molecules in the liquid crystal layer is 40 to 50 degrees from the extending direction of one of the grating-type and/or finger-type electrodes of the first plurality of electrodes and the second plurality of electrodes.

4. The liquid crystal device according to claim 1, wherein an initial alignment of liquid crystal molecules of the liquid crystal layer is 85 to 95 degrees from an extending direction of one of the grating-type and/or finger-type electrodes of the first plurality of electrodes and the second plurality of electrodes.

5. The liquid crystal device according to claim 1, wherein the liquid crystal device further comprises:
   a first alignment layer disposed between the first plurality of electrodes and the liquid crystal layer, and
   a second alignment layer disposed between the second plurality of electrodes and the liquid crystal layer,
   wherein the first alignment layer and the second alignment layer are configured to align liquid crystal molecules in the liquid crystal layer to an initial alignment.

6. The liquid crystal device according to claim 1, wherein a ratio of a distance between a first pair of electrodes of the first plurality of electrodes that generate a first in-plane electric field and a distance between a second pair of electrodes of the first plurality of electrodes that generate a second in-plane electric field is substantially equal to one.

7. The liquid crystal device according to claim 6, wherein the ratio of the distance between the first pair of electrodes of the first plurality of electrodes that generate the first in-plane electric field and the distance between the second pair of electrodes of the first plurality of electrodes that generate the second in-plane electric field is between 0.9 to 1.1.

8. The liquid crystal device according to claim 1, wherein a distance between a first pair of electrodes of the first plurality of electrodes that generate a first in-plane electric field along a direction perpendicular to an initial alignment of liquid crystals of the liquid crystal layer is shorter than a distance between a second pair of electrodes of the first plurality of electrodes that generate a second in-plane electric field along a direction parallel to the initial alignment of the liquid crystals of the liquid crystal layer.

9. The liquid crystal device according to claim 1, wherein electrodes of the first plurality of electrodes that generate a first in-plane electric field, electrodes of the first plurality of electrodes that generate a second in-plane electric field perpendicular to the first in-plane electric field, and electrodes of the first plurality of electrodes that generates an out-of-plane electric field are formed on a same level parallel to the first substrate.

10. The liquid crystal device according to claim 1, wherein electrodes of the first plurality of electrodes that generate a first in-plane electric field, electrodes of the first plurality of electrodes that generate a second in-plane electric field perpendicular to the first in-plane electric field, and electrodes of the first plurality of electrodes that generates an out-of-plane electric field are at different levels parallel to the first substrate.

11. The liquid crystal device according to claim 1, further comprising:
   a first polarizer, disposed on one side of the liquid crystal layer; and
   a second polarizer, disposed on the other side of the liquid crystal layer,
   wherein the first polarizer and the second polarizer are configured to polarize the light coming in or out from the liquid crystal layer.

12. The liquid crystal device according to claim 1, further comprising:
   a plurality of driving modules, connecting to the first plurality of electrodes and the second plurality of electrodes to control the first plurality of electrodes and the second plurality of electrodes to generate the electric field in the three orthogonal directions.

13. A system for THz electromagnetic waves, comprising: a liquid crystal device according to claim 1.

14. The liquid crystal device according to claim 1, wherein a thickness of the cell gap is between 50-150 μm.

15. The liquid crystal device according to claim 1, wherein each pixel element of the plurality of pixel elements has the same electric signal.

16. The liquid crystal device according to claim 1, wherein the liquid crystal layer is subjected to the electric fields in the three orthogonal directions generated by the first plurality of electrodes and the second plurality of electrodes, and a phase of an incident electromagnetic wave is changed due to a reorientation of the liquid crystal layer changes in respond to the electric fields.

* * * * *